(12) United States Patent
Misikangas

(10) Patent No.: US 7,904,097 B2
(45) Date of Patent: Mar. 8, 2011

(54) LOCATION DETERMINATION TECHNIQUES

(75) Inventor: Pauli Misikangas, Helsinki (FI)

(73) Assignee: Ekahau Oy, Helsinki (FI)

( * ) Notice: Subject to any disclaimer, the term of this patent is extended or adjusted under 35 U.S.C. 154(b) by 1127 days.

(21) Appl. No.: 11/633,440

(22) Filed: Dec. 5, 2006

(65) Prior Publication Data

US 2007/0149216 A1 Jun. 28, 2007

Related U.S. Application Data

(60) Provisional application No. 60/751,630, filed on Dec. 20, 2005.

(30) Foreign Application Priority Data

Dec. 7, 2005 (FI) .................................. 20055649

(51) Int. Cl.
*H04Q 7/20* (2006.01)

(52) U.S. Cl. ........................ 455/456.1; 455/403

(58) Field of Classification Search ............... 455/67.7, 455/67.11, 456.1, 456.5, 457, 403
See application file for complete search history.

(56) References Cited

U.S. PATENT DOCUMENTS

| 6,288,675 | B1 * | 9/2001 | Maloney | 342/457 |
| 6,393,294 | B1 | 5/2002 | Perez-Breva et al. | |
| 7,299,059 | B2 * | 11/2007 | Misikangas et al. | 455/457 |
| 2001/0022558 | A1 | 9/2001 | Karr, Jr. et al. | 455/466 |
| 2004/0095276 | A1 | 5/2004 | Krumm et al. | |
| 2006/0080035 | A1 * | 4/2006 | Daubert et al. | 701/211 |
| 2008/0209521 | A1 * | 8/2008 | Malaney | 726/4 |

FOREIGN PATENT DOCUMENTS

| EP | 1 301 055 A1 | 4/2003 |
| WO | WO 02/054813 A1 | 7/2002 |
| WO | 03/102622 | 12/2003 |
| WO | WO 03/102622 A1 | 12/2003 |
| WO | 2004/008795 | 1/2004 |
| WO | WO 2004/008795 A1 | 1/2004 |
| WO | WO 2004/008796 A1 | 1/2004 |

OTHER PUBLICATIONS

European Search Report dated Mar. 22, 2007 for corresponding European Patent Application No. 06125313.4.

* cited by examiner

*Primary Examiner* — Dwayne D Bost
*Assistant Examiner* — Myron Wyche
(74) *Attorney, Agent, or Firm* — Barnes & Thornburg LLP

(57) ABSTRACT

A method for estimating a target object properties, including location, in an environment. A topology model indicates permissible locations and transitions and a data model models a location-dependent physical quantity which is observed by the target object's sensing device. Motion models model specific target object types, obeying the permissible locations and transitions. The target object is assigned a set of particles, each having a set of attributes, including location in relation to the topology model. The attributes estimate the target object properties The particles' update cycles include: determining a degree of belief for each particle to estimate the target object properties; determining a weight for each particle based on at least the determined degree of belief and generating new particles for update cycle n+1 in an evolutionary process.

25 Claims, 13 Drawing Sheets

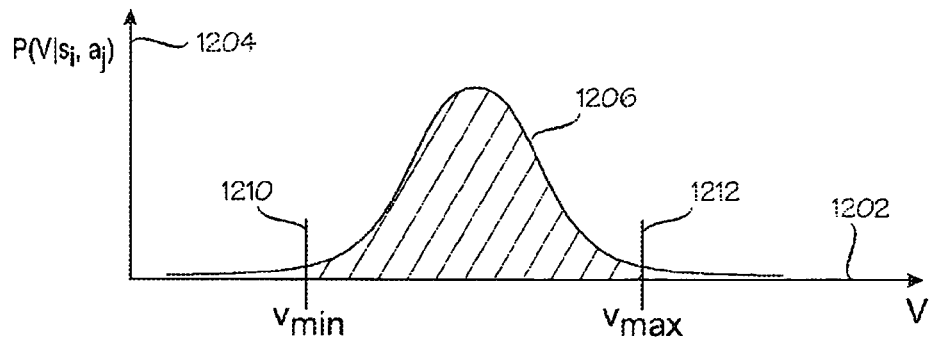
Fig. 12A
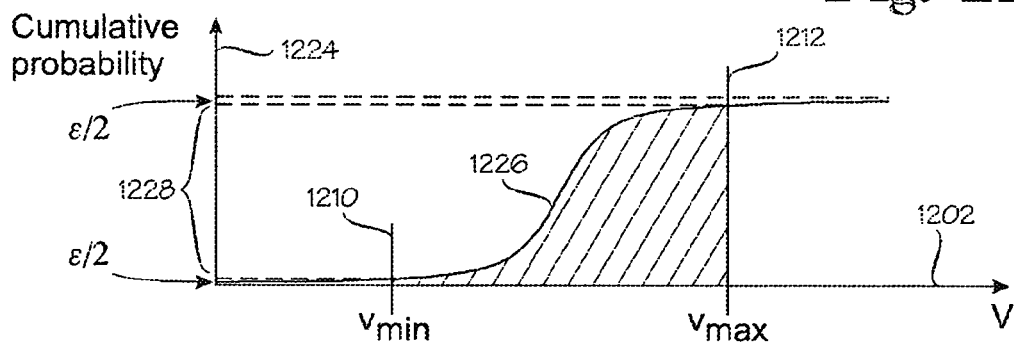
Fig. 12B
Fig. 13
1300
1302 → For each $a_j \in A$ do
  Begin
  1304 → For each $v \in V$ set $R_j[v] = \{\}$
  1306 → For each $s_i \in S$
    Begin
    1308 → Calculate $v_{min}$ such that $P(V<v_{min} | s_i, a_j) = \varepsilon/2$
    1310 → Calculate $v_{max}$ such that $P(V>v_{max} | s_i, a_j) = \varepsilon/2$
    1312 → For each $v$ in $[v_{min}, v_{max}]$ do
      1314 → $R_j[v] = R_j[v] \cup \{s_i\}$
    End
  End

Fig. 14

```
1400
        Function Find_relevant (in v̄)
        Begin
1402 →      Set C= {} // set of candidates
1404 →      F_max = 0 // Number of audible access points
1406 →      For each v_i ∈ v̄, v_i ≠ NA Do
            Begin
1408 →          F_max = F_max + 1
1410 →          For each s_j ∈ R_i[v_i] Do
                Begin
1412 →              If s_j ∉ C Then
                    Begin
1414 →                  C = C ∪ {s_j} // add to set of candidates
1416 →                  F[j] = 1// initialize hit counter
                    End
                    Else
1418 →                  F[j] = F[j] + 1 // increase hit counter
                End
            End
1420 →      Set R = {}
1422 →      For each s_j ∈ C Do
            Begin
1424 →          If (F_max - F[j]) ≤ K Then
1426 →              R = R ∪ {s_j} // Add to set of relevant sample points
            End
1428 →      Return R
        End
```

Fig. 15

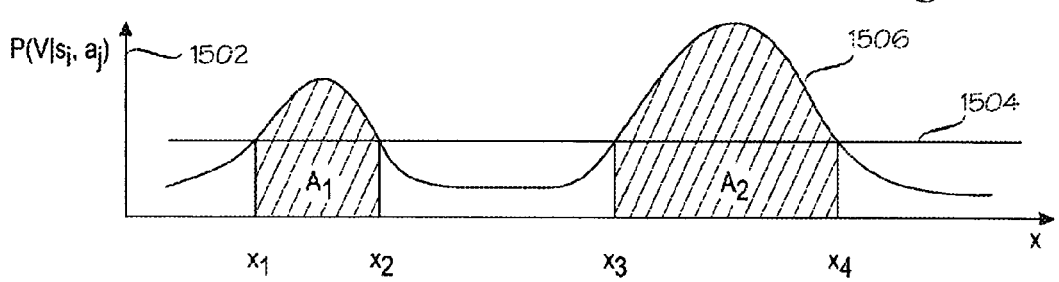

Fig. 16
- N1 - N20: Graph nodes
+ T1 - T4: Target object locations at 4 different times
( ) S11 - S13: Sets of relevant sample points
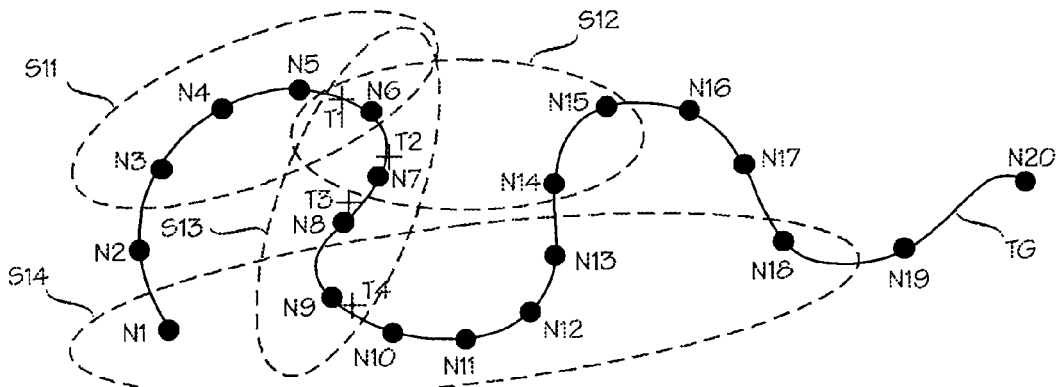
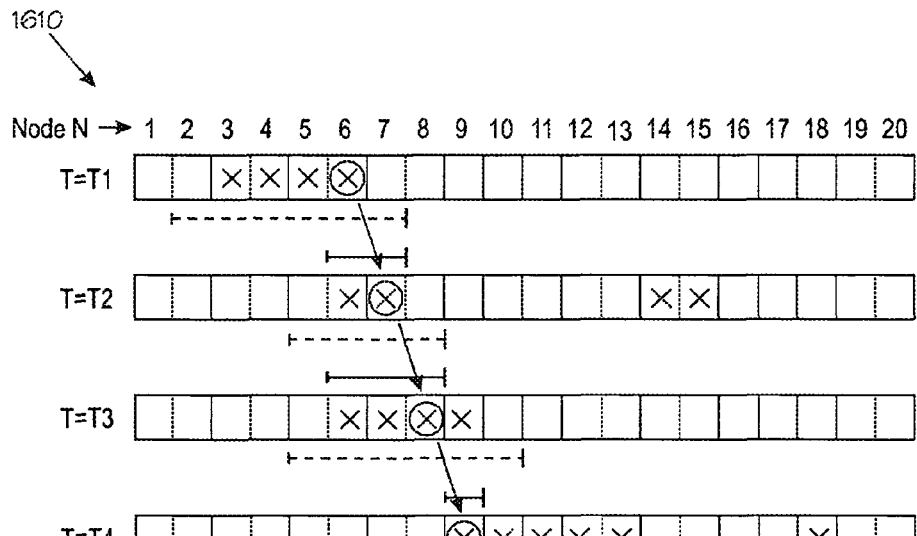
⊢--⊣ Neighbours of relevant sample points
⊢—⊣ Neigbours after excluding impossible transitions

LOCATION DETERMINATION TECHNIQUES

This non-provisional application relies for priority upon U.S. Provisional Application No. 60/751,630, filed on Dec. 20, 2005, which, in turn, relies for priority upon Finnish Patent Application No. 20055649, filed on Dec. 7, 2005, the contents of both of which are incorporated herein by reference in their entireties.

BACKGROUND OF THE INVENTION

The invention relates to methods, apparatus and software products for determining a set of properties of a target object in an environment. Illustrative examples of the target object include a person, animal, vehicle, instrument, shopping cart or project folder. An illustrative example of the target device property set includes location. An illustrative but non-restrictive application of the invention involves locating a wireless mobile terminal in a wireless communication environment, such as in a wireless local-area network (WLAN) or cellular network.

U.S. Pat. No. 6,393,294 to Luis Perez-Breva et al. discloses a representative prior art technique for locating a mobile unit in wireless communication system. The location of a remote mobile unit is determined by comparing a snapshot of a predefined portion of the radio-frequency spectrum taken by the mobile unit to a reference database containing multiple snapshots taken at various locations. Thus this technique, like many others, is based on a comparison of signal parameter observations at the mobile device's location with a database of calibrated or simulated parameters at several known locations.

Conventional techniques have problems in modelling the target object's movement. Many conventional techniques model the target object's movement by a number of states. Increasing the number of possible states increases the number of state transitions rapidly, which consumes memory and causes a high computational load.

BRIEF DESCRIPTION OF THE INVENTION

An object of the present invention is to provide a method and an apparatus for implementing the method so as to alleviate the above disadvantages. The object of the invention is achieved by the methods, apparatus and software products which are characterized by what is stated in the independent claims. Preferred embodiments of the invention are disclosed in the dependent claims.

The invention is based on the idea of cyclically determining a location of a target object in a positioning environment by means of a plurality of particles, each of which is associated with a set of attributes, such that the attributes of the particles assigned to the target object collectively model the target object's properties. The particles evolve in a process which is somewhat analogous to natural selection. Particles whose attributes model the target object's properties with a high degree of belief have a high likelihood of having descendant particles in a next update cycle and vice versa. In a location-estimation application, a particle may have a high associated degree of belief if it explains observations made at the target object's location well. If a particle explains the observations well, its attributes, which are roughly analogous to genes in nature, are likely to survive into following cycles.

The descendant particles' properties, such as location and/or velocity, are derived from those of their parent particles by using an appropriate algorithm. For example, the algorithm may make random changes to properties inherited from the parent particles.

An aspect of the invention is a method for estimating a set of properties of a target object in an environment, wherein the set of properties comprises location. The method comprises:
  modelling the environment with a topology model and a data model, wherein the topology model indicates permissible locations and transitions within the environment, and the data model indicates at least one location-dependent physical quantity for each of several permissible locations indicated by the topology model;
  modelling location changing characteristics of the target object with one or more motion models, wherein each motion model models a specific type of a target object and obeys permissible locations and transitions indicated by the topology model;
  associating to the target object one or more co-located sensing devices, each of which is capable of making observations of one or more of the location-dependent physical quantities;
  assigning to the target object a set of particles, each of which has a set of attributes, wherein the set of attributes comprises at least a location in relation to the topology model;
  estimating the set of properties of the target object with the set of attributes of the particles assigned to the target object; and
  updating the set of particles in a plurality of update cycles, wherein each update cycle comprises the following phases a) to c):
    a) determining a degree of belief for each particle to accurately estimate the set of properties of the target object, using the data model and observations from at least one sensing device associated to the target object;
    b) determining a weight for each particle based on at least the determined degree of belief; and
    c) generating a set of new particles for update cycle n+1 wherein;
      at least some of the new particles are based on one or more parent particles for update cycle n, wherein the likelihood of a particle for update cycle n to be selected as a parent particle for a new particle in update cycle n+1 is a non-decreasing function of the weight of the particle; and
      the set of attributes of a new particle for update cycle n+1 is derived from the set of attributes of one or more parent particles for update cycle n by using at least one of the one or more motion models and a predetermined algorithm.

Other aspects of the invention comprise a property-estimation apparatus for executing the above method and a computer program product which causes the performance of the above method when the computer program product is executed in a data processor.

An advantage of the invention is a certain robustness, which stems at least partially from the fact that the plurality of particles cope with unexpected target object movements better than most prior art techniques which attempt to fit a single motion model to a target object.

The invention is based on the idea that prior art techniques for estimating a target object's location are deterministic, and such deterministic approaches encounter severe problems in unforeseen or unlikely situations. The inventive technique is based on the use of a plurality of particles which collectively estimate the target object's properties, such as location. When the target object makes an improbable move or turn, the deterministic techniques tend to become confused. The particles according to the present invention, however, develop in a manner which is largely equivalent to natural evolution. The particles which best model the target object's properties tend to have a higher likelihood of having descendent particles in the next cycle, whereby poorly-fitting particles tend to die out. Even in highly unlikely situations, when most particles are wiped out, a small number of particles survive to following cycles.

In a typical implementation of the invention, the set of properties of the target object comprises the target object's location, or a location-related property of the target object. Examples of location-related properties include time derivatives of location, such as velocity and acceleration. In a typical implementation, the target object's location or location-related property is determined at least temporarily. A temporary determination of target object's location means, for example, that the target object's location is determined but only used as a temporary quantity for determining one or more further location-dependent quantities, after which the location may be discarded or concealed from external entities. In order to make the following description of the invention easier to understand, the description is based on the assumption that the invention will be used to determine at least the location of the target object. However, it is to be noted that useful location-dependent services may be provided without revealing or even internally determining the target object's location in any coordinate system. In other words, the location does not necessarily involve any metrics, and any or some of the locations may be expressed in abstract terms, such as an arbitrary node identifier in a topology model, or by means of some naming convention, such as "room 123".

In the above definition of the invention, the sensing device means a device which is able to make observations of one or more location-dependent physical quantities in the environment. A non-exhaustive list of applicable physical quantities includes:
- radiometric signal quality values, such as signal strength, signal-to-noise ratio, bit error rate/ratio, timing advance, or the like; such signal quality values, if used, are preferably determined separately for each of several frequency bands, channels, cells, base stations or the like;
- atmospheric physical quantities, such as air pressure, temperature, humidity, or the like;
- acoustic quantities, such as noise level, preferably determined separately for each of several frequency bands;
- optical quantities, such as light intensity, colour, spectrum, or the like;
- recognized shapes in still or live images or recognized sounds.

The target object refers to an entity whose property set is to be determined. In a typical embodiment of the invention, no specific acts are required to implement the target object or its physical properties. The target object may be a human, animal, apparatus, vehicle, shopping cart, project folder, or the like. The property set may comprise location, and/or a location-related physical property, such as velocity or acceleration. In addition, the property set may comprise further properties, which may even be determined independently of the location or location-related property, and which can be mapped to the location or location-related property. This means, for example, that a first set of location-dependent physical quantities are used to determine the target object's location or location-related property, and a second set of quantities, determined independently of the first set of quantities, is mapped to the target object's location.

In the context of the present invention, the terms 'quantity', 'property' and 'attribute' are intended to be used as follows. 'Quantity', as in the context of a location-dependent physical quantity, refers to a physical value detected by the one or more sensing devices. 'Property', in the context of the target object's property set, refers to a value which is the real information item to be determined. 'Attribute' is a value of each particle used to estimate the target object's property set. In an illustrative but non-restricting example, the target object may be a doctor carrying a wireless communication terminal. The doctor's location and velocity are examples of the target object's properties. The signal values, such as signal strength or bit-error ratio, are examples of the location-dependent physical quantities observed by the sensing device, which is the radio-frequency unit of the communication terminal. The target object's property set is estimated by means of a set of particles, each of which has, in this example, at least a location attribute and a velocity attribute.

The determination of the target object's location is based on the assumption that the target object is proximate to or co-located with one or more sensing devices. In some implementations the target object and the one or more sensing devices may be encapsulated in a single physical enclosure. For example, the target object to be positioned may be a communication terminal, in which case the sensing device may be the circuitry that measures location-dependent physical quantities, such as signal strength, signal-to-noise ratio, bit error rate/ratio, timing advance, or the like.

In some implementations, the target object to be positioned may be associated to several sensing devices. For instance, a hospital patient or very valuable instrument may be provided with several sensing devices for increasing positioning accuracy, certainty and/or reliability.

In one implementation, a motion model is a function, algorithm or other type of functional data structure which is used to generate a set of candidate locations and motional attributes for descendent particles, given the location and motional attributes of the parent particle(s) and motional characteristics of a specific type of target object. The particles' transitions between generations preferably depend on the time between generations.

Even in implementations in which each target object is associated to a single sensing device, it is advantageous to treat the target object and sensing device as two distinct concepts. This is because in many applications of the invention, the really important piece of information is not the location of the target object but the location of a person, animal or vehicle carrying the target object. The target object, such as a wireless communication terminal, may be alternatively carried by different persons or vehicles. Thus it is beneficial to maintain a plurality of different motion models for modelling the motion of several different target objects. For example, in a hospital environment, there may be motion models for healthy humans, wheelchair patients (or wheelchairs), transport beds, bicycles, scooters, etc. One of the benefits of an aptly chosen motion model is seen in situations where the sensing device's observations cannot be processed for one or more cycles. For example, the sensing device may be temporarily unable to measure a valid signal, or a position-estimating apparatus, such as server, may be too busy to process all observations. In such situations, the particles' movement continues based on the applicable motion model(s), independently of the missing observations, until the observations can again be processed and a new set of particles can be generated. Thus the parameters of the motion model depend on the parameters of the person or vehicle associated to the target object.

The data model for modelling the environment can be implemented as a data structure or physical structure which indicates at least one location-dependent physical quantity for each of several locations within the environment. In one implementation, the data model comprises, or is otherwise able to indicate, a plurality of sample points and at least one location-dependent physical quantity for each of the sample points. Signal quality values, such as signal strength or signal-to-noise ratio are non-restricting examples of suitable location-dependent physical quantities. The wording "otherwise able to indicate" means that the data model does not have to store actual values for the location-dependent physical quantities, as long as the quantities may be derived from any values stored by the data model.

As regards physical implementation, the data model may be a data structure or a set of data structures stored in a memory of a data processor, such as a microprocessor. If a single data processor is to determine the properties of a large number of target objects, the data processor should be a high-performance microprocessor or processor array. In a more hardware-oriented implementation, the data model may comprise a storage element, such as a low-loss capacitor, for each location-dependent physical quantity and each sample point, such that the charge of the capacitor corresponds to the value of the physical quantity at the corresponding sample point.

The sensing devices, in turn, may be associated with a plurality of device models such that each different device model comprises different correction parameters for correcting the sensing devices' observations. In one implementation, each different device model may be a different calibration curve. An embodiment of the inventive technique comprises maintaining a plurality of device models each of which is capable of correcting observations of one or more sensing devices, selecting a specific device model for at least one of the co-located sensing devices, and correcting the observations of the at least one of the co-located sensing devices with the selected device model.

Even if the target object (or sensing device attached to it) is capable of making near-perfect measurements in laboratory conditions, its apparent measurement capabilities may be affected by placement and/or orientation in relation to nearby objects, and/or height. For example, the target object of interest may be a hospital patient wearing an identification tag, which constitutes the sensing device. If the patient happens to fall down on the floor, the sensing device's orientation and height will change. Alternatively, a fracture in the sensing device's antenna may affect its sensitivity. Such situations can be detected by noting that the sensing device's observations are best explained by using a device model that applies an appropriate, experimentally-derived correction. Accordingly, one or more of the device models may be associated with specific circumstances, such as fractured antenna, patient lying on the floor, sensing device obscured by objects, etc. In some implementations the device model for the sensing device attached to a target object is selected adaptively, wherein the adaptive selection comprises selecting at least one specific device model for each particle and setting the attribute set of a particle to contain a reference to each device model selected for the particle; and applying each device model referred to by a particle to correct observations from the at least one sensing device before determining a degree of belief for the particle.

It is not necessary to have a priori information on the motion model which best models the target object or on the device model which best models the sensing device. Instead a subset of the particles may be assigned to each of several motion models and/or device models, and the best-fitting motion models and device models tend to have more descendents than poorly-fitting models do, and tend to survive in the long run. In one implementation, the motion model for a target object is selected adaptively, wherein the adaptive selection comprises selecting a specific motion model for each particle so that the attribute set of a particle contains a reference to the motion model selected for the particle and the step of deriving the set of attributes of a new particle from the set of attributes of one or more parent particles comprises using the motion models referred by the parent particles.

In the evolution of the particles, ie, the generation of a new set of particles for cycle n+1 based on the parent particles for cycle n, the number of parents for a single descendent particle may be one or more. If a descendent particle has a single parent particle, then the descendent particle inherits the attributes of the single parent particle, although the attributes may be, and typically are, transformed between generations by an algorithm which may add random variations to the inherited attributes. For example, a particle whose velocity attribute has a value of 65 may have a set of descendents whose velocity attributes range from 55 to 75. On the other hand, two particles with different attributes may both be selected as common parents for a set of descendent particles, such that the two parents both contribute to the attributes of their descendents. For example, two particles with velocity attributes of 30 and 70 may both be selected as common parents for a set of descendent particles. If the weight of the first particle (velocity=30) is three times the weight of the second particle (velocity=70), then a velocity of 40 is a good starting point for the velocity of the descendents. This starting point may be subjected to predetermined modifications, such as random or pseudorandom variations. In this example, the number of parents for a common descendent was two, but the number of parents may be any practical value.

The robustness of the method or apparatus, ie, the ability to cope with unexpected situations, can be further improved by generating some of the particles without any parent particles, at least in some of the cycles. In extreme cases, if the data model is constructed poorly, it may happen that all or almost all of the particles are locked to locations which have very sharp local weight maxima, and the particles' descendents which are generated outside the locations of the maxima, will die out. In order to avoid such situations, it is beneficial to generate parentless particles outside such locations. The parentless particles may be generated at randomly-chosen locations, from where they are able to generate descendent particles progressively closer to the target object's true location in the course of several cycles. Instead of generating the parentless particles at randomly-chosen locations, they may be generated at locations for which some a priori information exists. Such a priori information may be obtained by determining a particularly relevant portion of the data model, for example. Alternatively or additionally, such a priori information may be based on the last known location of the target object, and the last known location may be obtained by redundant means. For instance, assume that the target object is normally located by means of signal quality observations, and uncertainty concerning the target object's location increased suddenly. But if the target object's recent location can be determined on the basis of some act, such as proceeding via a well-defined check point, it is beneficial to generate "fresh", ie parentless, particles in the vicinity of the well-defined check point.

It is beneficial to restrict the mobility of the particles to locations with a reasonable likelihood of being the target object's true location. One way to do this is to use the above-mentioned motion models, because the motion models exclude attributes, such as velocities, which are beyond the capabilities of the target object as specified by the motion model. As stated above, the type of the target object is not always known with certainty, and a wrongly-chosen motion model may lead to generation of particles whose locations have a very low likelihood of being the target object's correct location, but such wrongly-chosen motion models die out rapidly.

Some implementations of the invention comprise calculating transfer probabilities for transfers between consecutive location estimates, such that the transfer probabilities depend on the motion model. For instance, the motion model applied in a hospital may not strictly rule out a velocity which is consistent with running, but the motion model may indicate a low probability for transfers which require running. Likewise, wheelchairs do not normally move in stairways, but it is not impossible that a wheelchair is carried in a stairway. Therefore, a transition along a stairway for a wheelchair could have a low, but non-zero, probability.

Another way to restrict the mobility of the particles is to use a graph or other type of model which models the topology of the positioning environment. Reference document 1 (WO2004/008795) discloses location-determination techniques which use a graph that models the topology of the target object's communication environment. Reference document 1 teaches using the topology model to restrict the mobility of the target object, but in the context of the present invention, the topology model can be used to restrict the mobility of the particles. In one implementation, the topology model comprises nodes and arcs between the nodes to indicate the permissible locations and transitions.

In some embodiments of the invention, the data model is or comprises a probabilistic model which indicates a probability distribution for the at least one location-dependent physical quantity at the permissible locations in the topology model; wherein the step of determining a degree of belief for a particle comprises indicating a probability distribution for a location-dependent physical quantity at the location of the particle by using the data model; and using the indicated probability distribution to determine the probability of an observation of the quantity from at least one sensing device associated to the target object.

In one implementation, the probabilistic model indicates a probability distribution for the at least one location-dependent physical quantity at several sample points; wherein the step of indicating a probability distribution comprises selecting at least two sample points near the location of the particle; and combining the probability distributions for the quantity at the selected sample points. For example, the step of combining the probability distributions may comprise forming a cumulative distribution function for each selected sample point and weighting each of the cumulative distribution functions with a relative weight; and forming a combination of the weighted cumulative distribution functions.

The probabilistic model and the topology model may be combined such that the topology model comprises nodes and arcs between the nodes to indicate the permissible locations and transitions and the step of selecting at least two sample points comprises selecting at least two of the sample points that can be reached from the location of the particle by following the arcs.

The degree of belief (such as probability) for each particle to estimate the target object's true properties (such as location) may be determined based on the probability of the observed signal values at the location of the particle. For instance, the probability may be determined as disclosed in reference document 4 (WO02/054813). As used herein, a 'degree of belief' is a term which encompasses conventional probability as well as corresponding quantities used in other fields of applied mathematics, such as fuzzy logic. In one implementation, the degree of belief is a nearest-neighbour-type distance measure, such as a Euclidian distance in signal space.

Probability distributions at the sample points can be determined by actual measurements, computer simulations (eg ray-tracing techniques) or by any combination of such techniques. Most particles will not be located at the data model's sample points, but a probability distribution for any arbitrary location may be derived from the probability distributions at the sample points by interpolation or extrapolation. Reference document 2 (WO03/102622) discloses techniques which can be used to determine probability distributions for signal values at locations of a target object when these locations do not coincide with the locations of the sample points. In the context of the present invention, the techniques disclosed in said reference document 2 can be applied to determine probability distributions for signal values at the locations of the particles. Interpolated or extrapolated signal value distributions may be cached for future reference.

One of the attributes of the particles may be a time series estimate of the signal values. In one implementation, the time series estimate of the signal values is used to obtain information regarding measurement bias. Such measurement bias may be caused by the juxtaposition of the sensing device and the target object. For instance, the target object and/or some related equipment may attenuate the signals observed by the sensing device.

The weight for each particle will be determined based, at least partially, on the determined degree of belief. Generally speaking, the higher a particle's weight is, the higher is the likelihood for that particle to have descendent particles in the following cycles, but this statement is only true as a probabilistic principle. Due to the randomness inherent in the descendent-generating process, an individual low-weight particle may have one or more descendant particles while a high-weight particle has none.

In a simple implementation, the particle's weight equals the degree of belief for that particle to accurately estimate the property set of the target object. Or, the particle's weight may be derived from some mathematical function of the degree of belief. For instance, such a function can be used to emphasize relatively small differences at either end of the probability range (zero to one). In other embodiments, the weight may be based on a combination of factors, wherein the degree of belief is but one factor. An example of such other factors is the length of time since the previous cycle. For example, the particle's weight W may be computed as $W=p^{t/\beta}$, wherein p is the probability (or other kind of degree of belief) for the particle to accurately estimate the property set of the target object, t is the time since the previous update of the weight, and $\beta$ is a scaling constant.

Some embodiments of the invention make use of device models to correct the observations of the sensing devices. This feature is particularly useful in applications wherein the sensing devices are not specifically designed for accurate measurements. For example, wireless communication terminals may comprise a received signal-strength indicator (RSSI), but the measured signal-strengths may be grossly inaccurate. Accordingly, each device model comprises appropriate correction parameters for correcting the observations of a particular sensing device. For example, the correction parameters may comprise constant scaling parameters and/or linearization parameters. If a particular target object is provided or associated with several sensing devices, it is useful to apply a separate device model to the observations of each sensing device.

In some situations, a priori information on an optimal device model is available. For example, the sensing devices may be calibrated and a device model may be generated, or one of pre-existing device models may be selected and associated to the sensing device for future reference. If no such a priori information is available, the attributes of the particles may comprise an identifier of the device model being used. When "fresh" particles are assigned to a target object, ie, particles which are not descendents of parent particles, the identifier of the device model to be used may be assigned randomly. The random assignment of fresh particles to each device model is preferably based on the known or assumed proportion of devices conforming to the device model. In other words, if x % of devices correspond to device model N, x % of fresh particles should be assigned to device model N. This way, the selection of the current device model is also subjected to the natural evolution process provided by the present invention, and the best-matching device model will have more descendents than poorly-matching device models do.

Even in situations wherein a priori information on an optimal device model is available, it may still be beneficial if the attributes of the particles comprise either an identifier of the device model or the correction parameters indicated by the device model. This technique makes the correction provided by the device model adaptive. Such adaptivity is useful in situations wherein the sensing devices' ability to make accurate observations changes. For example, if the sensing device is a signal value measurement circuitry, such as an RSSI detector, the observations made by the measurement circuitry may be affected by the sensing device's height, orientation or placement, particularly placement in relation to obstacles. Assuming that the sensing device is an RSSI detector of a wireless terminal, its apparent sensitivity may increase considerably when the terminal is taken out from a handbag to ear level. The adaptive nature of this embodiment helps to compensate for such fluctuations.

Some embodiments of the invention relate to scalability considerations. In one embodiment, the number of particles assigned to one specific target object or each of several target objects is adjusted dynamically. Instead of dynamically changing the number of particles assigned to a target object or in addition to it, the duration of calculation cycles (determining the degree of belief, determining the weight and generating a set of new particles) may be changed dynamically.

One of the factors which may affect the dynamic change of the performance-related parameters is the overall load of the positioning apparatus. When the number of target objects to be located is high, the positioning apparatus may assign fewer particles per target object and/or reduce the number of calculation cycles per unit of time. Other factors affecting the performance-related parameters may include accuracy and/or confidence requirements, degree of uncertainty, available memory resources and the number and/or quality of the available observations. Another factor which may be considered is the variance in the attributes of particles. A high variance in the value of a particle's attribute among the set of particles indicates a need for more particles. Yet another factor potentially affecting the dynamic change of the performance-related parameters is the number of target objects, wherein the total amount of particles available in the positioning system is divided among the target objects. Also, different target objects may have different quality requirements for their property estimates. A target object with high quality requirements for its property estimate should have more particles assigned to it than a target object with low quality requirements has. Furthermore, the motion history of the target object may affect the number of particles assigned to the target object. The number of particles assigned to a target object may be reduced if the motion history indicates stable and predictable motion.

Another technique related to overall efficiency of a property-estimation apparatus involves dynamically adjusting the time interval between update cycles based on one or more of the following factors. One of such factors is the variance in the attributes of particles, wherein a high variance in the value of a particle attribute among the set of particles indicates a need for more frequent updates. Another factor is the number of target objects served by a common property-estimation apparatus. Also, a target object with high quality requirements for its property estimate should have more frequent updates than target objects with low quality requirements. Also, different target objects may have different priorities, which may even be changed dynamically, such as in emergency situations. For example, a very short update cycle can be used in case of a patient in an emergency situation. Also, a combined rate of observation sets received from the sensing devices per unit of time and/or a motion history of the target object may affect the update interval. Furthermore, the update interval per target object may be increased with increasing load of the property-estimation apparatus.

In order to avoid computations which serve no useful purpose, some particles may be eliminated based on external information. As used herein, such external information refers to information obtained via means other than the observations made by the sensing device. An example of such external information is independently-obtained location information. For example, the sensing device or the target object associated with it may be detected at the vicinity of some RFID (radio frequency identification) gate, in which case any particles sufficiently far from that RFID gate may be eliminated. Alternatively, the target object may be physically coupled to several independent sensing devices, such as a global positioning system (GPS) positioning device and an RSSI detector, but the GPS information is only available outdoors. When the GPS information is available, it may override the location information obtained via the RSSI detector, and any particles sufficiently far from the GPS-based location can be eliminated. Yet another technique to avoid computations which serve no useful purpose involves selecting a subset of the sample points of the data model, based on some relevance criteria. Such selected sample points will be called relevant sample points. Techniques for determining and using them will be further described later.

Some embodiments relate to history considerations. As stated above, the target object's property or properties are estimated or approximated by using a set of particles, such that each particle has an associated set of attributes. For example, each particle may have a location attribute and a velocity attribute, and the location and velocity attributes of all or some of the particles assigned to a target object collectively approximate the location and velocity properties, respectively, of the target object. Some embodiments refine the collective approximation process.

In one embodiment, a modification history of the particle attributes is analyzed by means of a genealogy tree of the particles. This technique can be used in route mining applications, which may be used to analyze the route taken by the target object.

In one embodiment, the set of particles used to approximate the target object's property set comprises only the particles in the latest generation. An estimate of the target object's properties (such as location and/or velocity) may be computed as a weighted average of the attributes of the particles used to approximate the target object's properties. The computation of the weighted average may use the same weight which determines the particle's likelihood to be selected as a parent particle for following generations, or it may use a different weight. In either case, the weight or weights should have positive correlation with degree of belief of the particle estimating the target object's property set.

In another embodiment, the set of particles used to approximate the target object's property set comprises particles in several generations. For example, the target object's property set may be determined based on the latest generation and a number of earlier generations. The weight of each particle in the computation of the weighted average may equal the combined weight of the descendents of the particle. In one implementation, the weight for each particle in one generation is re-computed based on the sum of weights of the particle's descendents in the most recent generation. This embodiment may enhance positioning certainty at the cost of some measurement/update cycles.

An exemplary embodiment for using particles in several generations comprises generating a snapshot of weighted particles for update cycle k, wherein the snapshot contains some or all particles for update cycle k, and assigning to each particle a weight defined by the following recursive rules. If k is the latest update cycle, the weight of a particle is based on the weight determined in step b of claim 1. On the other hand, if k is not the latest update cycle, the weight of a particle is based on the sum of weights of all direct descendants of the particle existing in a snapshot generated for update cycle k+1. The snapshot is used to estimate the set of properties of the target object at the time of update cycle k.

In one implementation, the method further comprises dividing the snapshot of weighted particles for update cycle k into one or more clusters, wherein each cluster contains particles that are similar to each other according to one or more predetermined similarity criteria; and selecting at least one cluster and estimating the set of properties of the target object at the time of update cycle k for each selected cluster by using particles and weights in the selected cluster and omitting particles and weights not in the cluster. For instance, at least one of the similarity criteria may be based on the particles' location, whereby each cluster contains particles close to each other. The clustering may be based on the genealogy tree mentioned earlier.

In one embodiment, the clustering is used in combination with the topology model by maintaining a plurality of predetermined zones, wherein each zone includes one or more permissible locations of the topology model; and wherein at least one of the similarity criteria is based on the plurality of zones, wherein particles whose locations belong to the same zone belong to the same cluster. As used herein, a zone is a term meaning one or more permissible locations of the topology model. Each zone may comprise one or more discrete locations which may be defined by means of a coordinate system or an abstract naming convention. Or, the zones may be permissible portions of a topology graph, coordinate ranges, etc.

The clustering process may be used to provide a confidence value. For instance, a confidence value may be associated to an estimate generated using a cluster, wherein the confidence value is based on the sum of weights of particles in the cluster divided by the total sum of weights of particles in the snapshot.

In one embodiment, the set of particles used to approximate the target object's property set may be used to generate a probability distribution of location for two or more target objects, and the probability distribution of location can be used to estimate the relative proximity of the two or more target objects.

One implementation of the clustering technique involves computing an estimate of the particles' attribute value by using the attribute values and weights of the particles in each cluster. A confidence measure of such an estimate may be determined by dividing the combined weight of the particles in the cluster by the combined weight of all particles. Further implementations of the clustering technique involve determining a usability measure of the estimate. For instance, such a usability measure may be determined based on the variance of the attribute values and/or the percentage of particles within a predetermined distance margin from the estimate's location. Yet another implementation involves determination of an area, such as a circle, ellipse or polygon, which encompasses p % of the particles. Thus the usability measure as a distinct concept from the confidence measure. For example, an area which encompasses the target object's location may have a high confidence value but a low usability value if that area is large enough to cover a significant portion of the entire positioning environment.

Further techniques for computing an estimate of the particles' attribute value by using the attribute values and weights of the particles in each cluster involve computing a weighted average of the particles' attribute values. Other implementations may involve determining a probability for each of one or more location areas or value ranges. Other implementations may involve determining the smallest circle, ellipse or polygon which encompasses p % of the particles. Yet other implementations may involve determining a number 1 ... N of high-density regions, ie, location areas or value ranges which collectively encompass p % of the particles. Further implementations may involve determining a number 1 ... M of particles which best represent the target object.

BRIEF DESCRIPTION OF THE DRAWINGS

In the following the invention will be described in greater detail by means of specific embodiments with reference to the attached drawings, in which:

FIGS. 12A and 12B illustrate a case in which the signal parameter values are treated as continuous values;

FIG. 13 shows an initialization algorithm for initializing sets of relevant sample points;

FIG. 14 shows an algorithm for finding a set of relevant sample points;

FIG. 15 illustrates expansion of the single-peak examples shown in FIGS. 12A-14 to multiple peaks; and FIG. 16 illustrates the use of a graph-based positioning technique in connection with the relevance indicators of an embodiment of the present invention.

DETAILED DESCRIPTION OF SPECIFIC EMBODIMENTS

Figure 1:
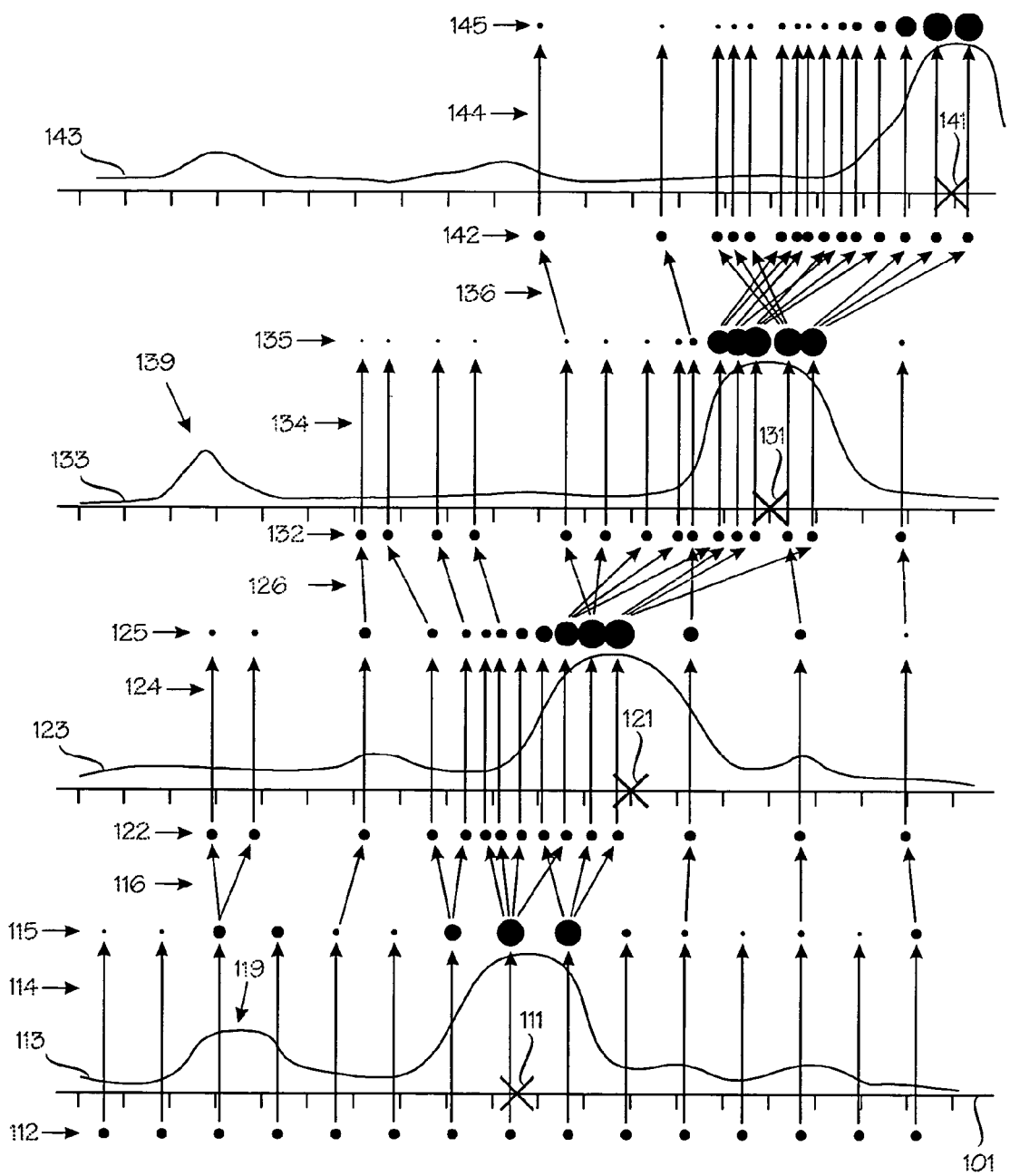
FIG. 1 illustrates an operating principle of the invention.

FIG. 1 illustrates an operating principle of the invention. The description of Figure is based on the assumption that the target object's property set is or comprises the target object's location. Reference numeral 101 denotes a path of the target object. The path 101 is provided with evenly-spaced tick marks. In the description of FIG. 1, the path is assumed to resemble a track along which the target object can only move forwards or backwards (to the left or right in FIG. 1).

FIG. 1 illustrates a process of performing four consecutive location estimation cycles for the target object. Each estimate is made at a specific instance of time. Time advances from bottom to top. Reference numerals 111-116 relate to the first location estimate, reference numerals 121-126 to the second estimate, and so on. Reference numeral 111 denotes the target object's location along the path 101. Naturally, the target object's location 111 is not known to the location estimation routine and is shown for illustration purposes only. Reference numeral 112 denotes a set of particles assigned to the target object and which will be used to estimate the target object's location, as will be explained later in more detail. In the example shown in FIG. 1, the number of particles is very small (15, to be precise), but this is only for the purposes of clarity. In reality, the number of particles assigned to each target object will be higher, preferably in the range of hundreds or thousands, depending on the required accuracy, confidence and robustness considerations. The number of particles assigned to each target object will be further described under a subheading "Performance considerations".

In this example, each of the particles 112 has an associated location and velocity. If the path 101 is treated as a track, the velocity can be a scalar number (with a positive or negative value), but in multi-dimensional implementations the velocity can be treated as a vector.

Reference numerals 111-116 relate to the first location estimation cycle. In the example shown in FIG. 1, we can assume that in the first location estimation cycle, the particles 112 are initially spaced evenly along the path 101 and each has a velocity of zero. These values are given as non-restrictive examples, and it will be seen that the initial values are not critical.

Reference numeral 113 denotes a probability curve which indicates the probability for each of the particles 112 to estimate the true location of the target object 111. Actually, what the location estimation technique needs is a distinct probability for each of the particles 112 to estimate the true location of the target object 111, and the probability curve 113 is only shown for the convenience of the reader. Exemplary techniques for determining the probabilities 113 are disclosed in connection with FIG. 4 and in reference document 2.

Reference numeral 114 denotes the step of determining a weight for each of the particles 112. The set of weighted particles is denoted by reference numeral 115. The probability 113 for each of the particles 112 to estimate the true location of the target object 111 is a principal factor in determining the weight for step 114, and in a simple implementation, the probability 113 can be the only factor in determining the weight. In some implementations, the weight may also be affected by other factors, such as the particle's past history or future. A particle's future is naturally not known in real-time location estimation, but it can be known during an analysis of a path taken by the target object. The weight may also be affected by the length of time since the previous update cycle.

Reference numeral 116 denotes the step of generating a new set of particles 122 for cycle 2 as descendants of the particles 112 for cycle 1. In step 116 the expected number of descendants in cycle 2 of a particle in cycle 1 is a non-decreasing function of the weight of the particle. This means that the new set of particles 122 for cycle 2 is derived from the set of the particles 112 for cycle 1, but it does not mean that each of the particles 112 for cycle 1 has a descendant in the set of particles 122 for cycle 2. Instead, the descendants for each particle are determined such that a particle with a high weight has a higher likelihood of being selected as a parent for descendants in the next cycle than does a particle with a low weight. But as is well known in connection with probabilistic techniques, events with a low probability do occur sometimes while high-probability events fail to occur, and in the present invention, a particle with a low weight may have one or more descendants while a particle with a high weight may have none.

The descendants 122 of the particles 115 are not identical copies of their parents, even after ignoring the weights. Instead the attributes, such as location and/or velocity, of each descendant particle is made to differ from the respective attributes of the parent particle by using a predetermined algorithm which, in an illustrative implementation, derives the attributes of the descendants from those of their parents by random or pseudorandom variations. For example, the location for each descendant particle may be the location of its parent plus its motion between update cycles (the velocity of the parent particle times the length in time of each update cycle). The velocity of the descendant particle may be formed by adding a suitably weighted random variation to the velocity of its parent. For example, the velocity of the descendant particle may be calculated as x percent the parent velocity plus 100−x percent pseudorandom variation.

A benefit of using (pseudo) random variations in the calculation of the velocities of the descendant particles is that the set of descendant particles tend to follow the movement of the target object by a process which resembles evolution and natural selection. Particles whose location and velocity match those of the target object will have high weights and, consequently, a high expected number of descendants. This is because the particles tend to concentrate at locations where the observed signal values have high probabilities. Inversely, particles whose location and/or velocity differ from those of the target object will have low weights and will eventually die out.

In the example shown in FIG. 1, each update cycle comprises a weight-determination step and a descendant-creation step. For example, a first update cycle comprises a weight-determination step 114 and a descendant-creation step 116. The second and third update cycles comprise, respectively weight-determination step 124, 134 and descendant-creation steps 126, 136, and so on. After each weight-determination step 114, 124, 134, 144, the particles are shown as circles of varying size, such that the size of each circle corresponds to the weight of the particle.

FIG. 1 also schematically illustrates the fact that the technique described will not be distracted by isolated high-probability peaks if such peaks are sufficiently far away from the target object's location. In FIG. 1, reference numeral 119 denotes a region of relatively high probability. An effect of the high-probability region 119 is the generation of the two leftmost particles in the particle set 124 in the second update cycle. These particles have no descendents in the third cycle, however, and another isolated high-probability region 139 does not cause generation of any descendants in the fourth update cycle because no potential parent particles exist in the vicinity of the isolated high-probability region 139.

The above-described method can be executed in the target object itself, assuming that it is provided with appropriate location-estimation software and a data model of the environment. Alternatively, the target object or a sensing device coupled to it may send its observations to a location-estimation apparatus which determines a location estimate for the target object based on the observations made at the target object's location.

Figure 2:
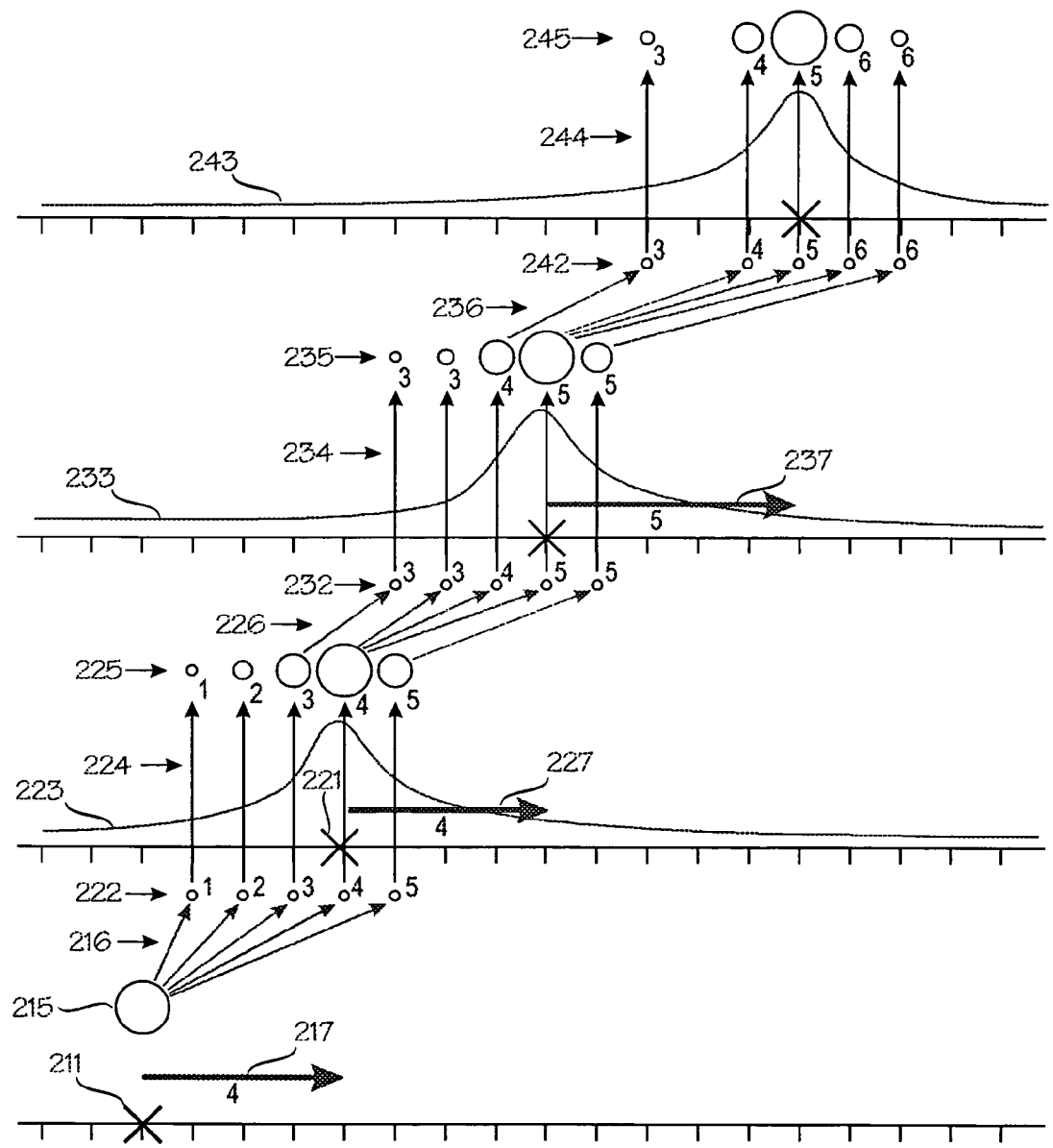
FIG. 2 shows an example of creating descendant particles for tracking the location and velocity of a target object.

FIG. 2 shows another example of creating descendant particles for tracking the target object's location and velocity. FIG. 2 is a simplified version of FIG. 1 in that it only shows the descendants of a single particle for enhanced clarity. Items denoted by reference numerals 2xx, ie numerals beginning with '2', are largely analogous to items denoted by reference numerals 1xx in FIG. 1. Reference numeral 211, 221, etc. denote the target object's location in a first, second, etc. update cycle shown in FIG. 2. Reference numerals 217, 227, etc. denote the corresponding target object velocities in consecutive update cycles.

In the first update cycle shown in FIG. 2, the target object has a location 211 and velocity 217. We may assume that as a result of the previous update cycle (not shown), a representative particle 215 has a velocity of approximately +3 (to the right-hand side of FIG. 2). In the following descendant-creation step 216, the particle 215 has five descendants which are collectively denoted by reference numeral 222, and which have velocities of 1, 2, 3, 4 and 5. Each descendant with a velocity of n (n=1, . . . , 5) is offset to the right of its parent by n units of distance. The numbers 1-5 to the right of each descendant indicates the velocity of the nearest descendant.

The velocity of particle 215 had a velocity of three, which is why the average location of the descendants 222 differ from the location 211 by three units. However, the target object's actual velocity 217 was approximately four units of distance per update cycle, and the target object's location 221 is offset from 211 by approximately four units of distance. Accordingly, the descendant particle 222 with a velocity of four (fourth one from the left) has the highest weight in the weight-determination step 224. The weighted particles are collectively denoted by reference numeral 225.

In the following descendant-creation step 226, the particle with a velocity of four has three descendants (with velocities of 3, 4, and 5), the particles with velocities of 3 and 5 have one descendant each, and the particles with velocities of 1 and 2 have no descendants and die out.

In the next update cycle, the target object's velocity increases to +5, as indicated by arrow 237. Accordingly, in the last weight-determination step 244 shown in FIG. 2, the one of the particles 242 with a velocity of 5 has the highest weight, and so on. It can be seen from FIG. 2 that the set of particles tracks the target object's movement very well even if the target object's velocity changes.

Until now, the description of the embodiments of the invention have been limited to a single dimension. One way to model target object movement in two dimensions is to process each of the movement components in x and y (and, optionally, z) directions as single dimensions, as has been described in connection with FIGS. 1 and 2. In an alternative embodiment, the target object velocity is modelled as a vector with a direction and a scalar magnitude. A third alternative will be described in connection with topology models, which will be described in connection with FIGS. 5A to 5D. Instead of using a true 3-dimensional coordinate system, many 3-dimensional structures can be treated as a plurality of 2-dimensional structures, such as floors or layers.

Figure 3A:
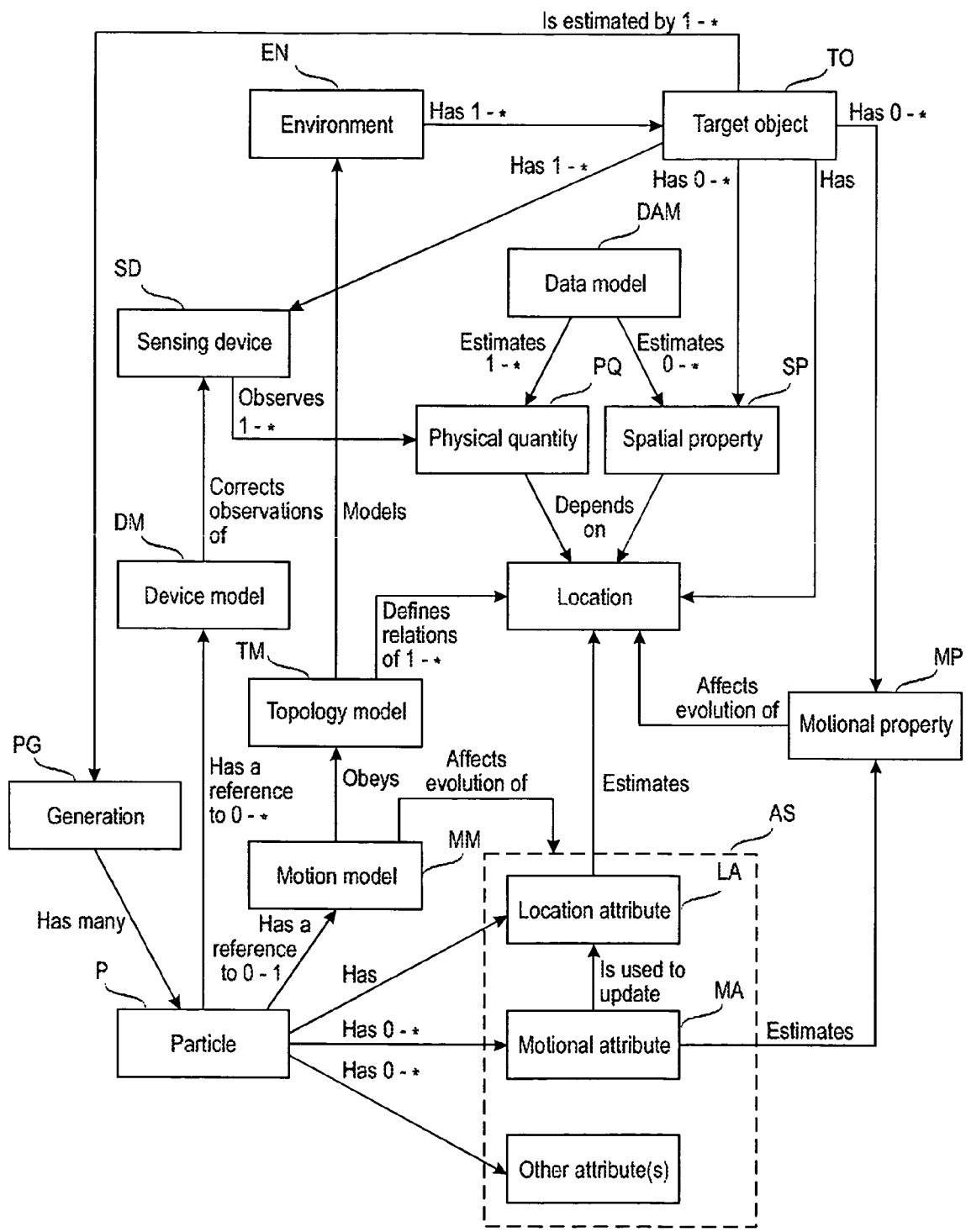
FIG. 3A shows relations between the various elements of the invention and its embodiments.

FIG. 3A summarizes the relations between the various elements of the invention and its embodiments. There are one or more target objects TO in an environment EN. The determination of the target object's location or location-dependent properties is based on the assumption that the target object is proximate to or co-located with one or more sensing devices SD. In some implementations the target object and the one or more sensing devices may be encapsulated in a single physical enclosure. For example, the target object may be a communication terminal, in which case the sensing device may be the circuitry that measures location-dependent physical quantities, such as signal strength, signal-to-noise ratio, bit error rate/ratio, timing advance, or the like.

Even in implementations in which each target object is associated to a single sensing device, it is advantageous to treat the target object and sensing device as two distinct concepts. This is because in many applications of the invention, the really important piece of information is not the location of the sensing device but the location of a person, animal or vehicle carrying it. The sensing device, such as a wireless communication terminal, may be carried by different persons or vehicles at different times. Thus it is beneficial to maintain a plurality of different motion models for modelling the motion of several different target objects. For example, in a hospital environment, there may be motion models for healthy humans, wheelchair patients (or wheelchairs), transport beds, bicycles, scooters, etc. One of the benefits of an aptly chosen motion model is seen in situations where the sensing device's observations cannot be processed for one or more cycles. For example, the sensing device may be temporarily unable to measure a valid signal, or a position-estimating apparatus, such as server, may be too busy to process all observations. In such situations, the particles' movement continues based on the applicable motion model(s), independently of the missing observations, until the observations can again be processed and a new set of particles can be generated. Thus the parameters of the motion model depend on the parameters of the person or vehicle in question.

Each target object TO has a set of associated spatial properties SP. The spatial properties depend on the target object's location. In a simple implementation of the invention, there are no additional spatial properties besides the target object's location. In another implementation, the set of associated spatial properties includes a location-dependent service. For instance, the target objects may be persons carrying wireless terminals and the location-dependent service may be the control of some electrical equipment, such as room lightning. A positioning system may automatically switch off room lightning in rooms which contain no target objects. In this scenario, the on/off status of room lightning is an example of a spatial property.

In situations wherein the target object's estimated set of properties includes at least one spatial property in the environment, the data model can indicate the spatial property for each location in the environment. The step of estimating the set of properties of the target object may comprise generating particle-specific estimates of the spatial property for each particle, using the data model to indicate the spatial property at the location of the particle and combining particle-specific estimates using the weights of the particles.

Each target object TO also has one or more co-located sensing devices SD. Each sensing device observes at least one location-dependent physical quantity PQ. A data model DAM models the environment EN by indicating how the one or more physical quantities vary depending on location.

The environment EN is also modelled by a topology model TM which contains transition information indicating possible locations and transitions within the environment. The locations are indicated in relation to the topology model TM, which may or may not have an associated measurement system or metrics MT. For example, the measurement system may be some kind of a coordinate system, such as rectangular or polar coordinates. The metrics MT is not a necessary element, however, and the topology model TM may indicate locations by means of some naming convention, such as "room 123", or by reference to entirely abstract names for the various locations.

A method according to the invention comprises assigning one or more generations PG of particles P to each target object TO. Each particle P has an associated attribute set, which comprises at least one location attribute LP, which is an estimate of the particle's location. The attribute set may also comprise zero or more motional attributes which collectively estimate the target object's motional properties MP, such as velocity, acceleration or the like.

In some implementations of the invention, the particles' location directly models the target object's location, but in more complex implementations the target object's spatial and motional properties may be derived from the particles' attribute sets by more complex functions or techniques.

The target objects' movement may be modelled by motion models MM. The motion models MM use the topology model TM and affect the evolution of the particles' location and motional attributes. Likewise, the sensing device's observation capabilities may be modelled and corrected by device models DM. The parameters of the motion models MM and/or device models DM assigned to the target object TO and sensing device(s) SD, respectively, may remain fixed or they may be part of the particle's attribute set, in which case the parameters also undergo the update cycles according to the invention.

Figure 3B:
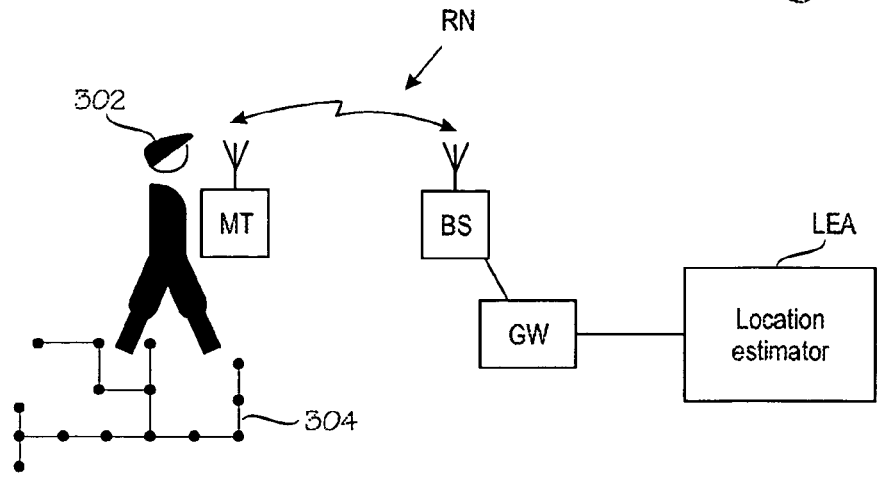
FIG. 3B illustrates mapping of the entities shown in FIG. 3A to real-world entities.

FIG. 3B shows a non-restricting example of mapping the entities shown in FIG. 3A to entities in a real-world scenario. A person 302 moves in an office which has a floor plan 304. The person communicates with a mobile terminal MT in a radio network RN. The mobile terminal MT observers one or more location-dependent signal-quality parameters in the radio network RN and sends its signal-quality observations via base station BS and a gateway element GW to a location-estimation apparatus LEA, which is an example of the property-estimation apparatus according to the invention. The location-estimation apparatus maintains data structures identifying the target objects and their associated sensing devices. It also maintains the various models and updates the attributes of the particle generations. The location estimation apparatus LEA can be implemented as a stand-alone apparatus, such as a server or a cluster of servers, depending on scalability and performance considerations, such as the number of target objects to be located, required accuracy, confidence and response time, etc. Alternatively, each target object, such as a portable or palmtop computer, can be equipped with an internal location estimation software.

In this scenario, the radio network RN and the floor plan 304 constitute aspects of the environment EN. The signal quality parameters in the radio network RN are examples of the location-dependent physical quantities PQ. For example, the signal quality parameter may be signal strength, bit error rate/ratio or signal-to-noise ratio, or any combination of such parameters. The measurement circuitry within the mobile terminal is an example of the sensing device SD. The data model DAM models the location dependency of the signal-quality parameters in the radio network RN. The topology model TM models the floor plan 304. Depending on application, the target object TO may correspond to the mobile terminal MT or the person 302 carrying it.

In some embodiments of the invention, motion models MM are used to model the movements of the target object, such as the person 302 carrying the mobile terminal. Each motion model models the mobility of a specific type of target object. For example, in a hospital environment, there may be motion models for healthy humans, wheelchair patients (or wheelchairs), transport beds, bicycles, scooters, etc. The motion models may specify one or more of the following parameters: average/maximum speed, average/maximum acceleration (ability to change speed or velocity), ability to move in stairs, escalators or elevators, or the like. When the location-estimating apparatus detects a new target object to be located, it may not know which motion model best describes the target object. Instead, the location-estimating apparatus may initially assign a portion of the target object's particles to each applicable motion model. For instance, such initial assignment may be proportioned according to the number of known representatives of the applicable motion models. If the location-estimating apparatus detects a target object moving in a stairway, it can determine that most motion models for wheeled devices are not applicable and distribute the particles among the remaining motion models. A high variance of motion models indicates an unreliable location estimate. Motion models will be further described in connection with FIGS. 6 and 7.

The observation sets from the target objects may be processed via one of several device models DM. Each device model comprises one or more correction parameters for correcting the observations made by the sensing devices SD. Adaptivity to changing conditions is improved if the attribute sets of the particles comprise an identifier or actual correction parameters of the device model. This way, the device model being applied is also subjected to the evolution process according to the invention. By means of the particles which best survive to subsequent cycles, it is possible to learn which device model should be used in connection with a given target object. Further techniques for creating and using device models is disclosed in reference document 3 (WO2004/008796).

In one embodiment, the data model DAM may be implemented as a probabilistic model of the radio network RN. The probabilistic model comprises a probability distribution of one or more signal parameter values at several known locations of the radio network RN. Such known locations are called sample points. The sample points are points of the probabilistic model at which probability distributions for the one or more measurable and location-dependent signal parameter value have been determined. For example, the signal parameter values at the sample points may be determined by means of physical calibration (actual measurements), computer simulation techniques, such as ray-tracing or the like, or any combination of such techniques. Each observation set comprises measured values of the same or related signal parameters. As used herein, 'related' signal parameters mean signal parameters which can be derived from each other. For example, signal-to-noise ratio can be derived from signal strength and noise measurements.

Figure 4:
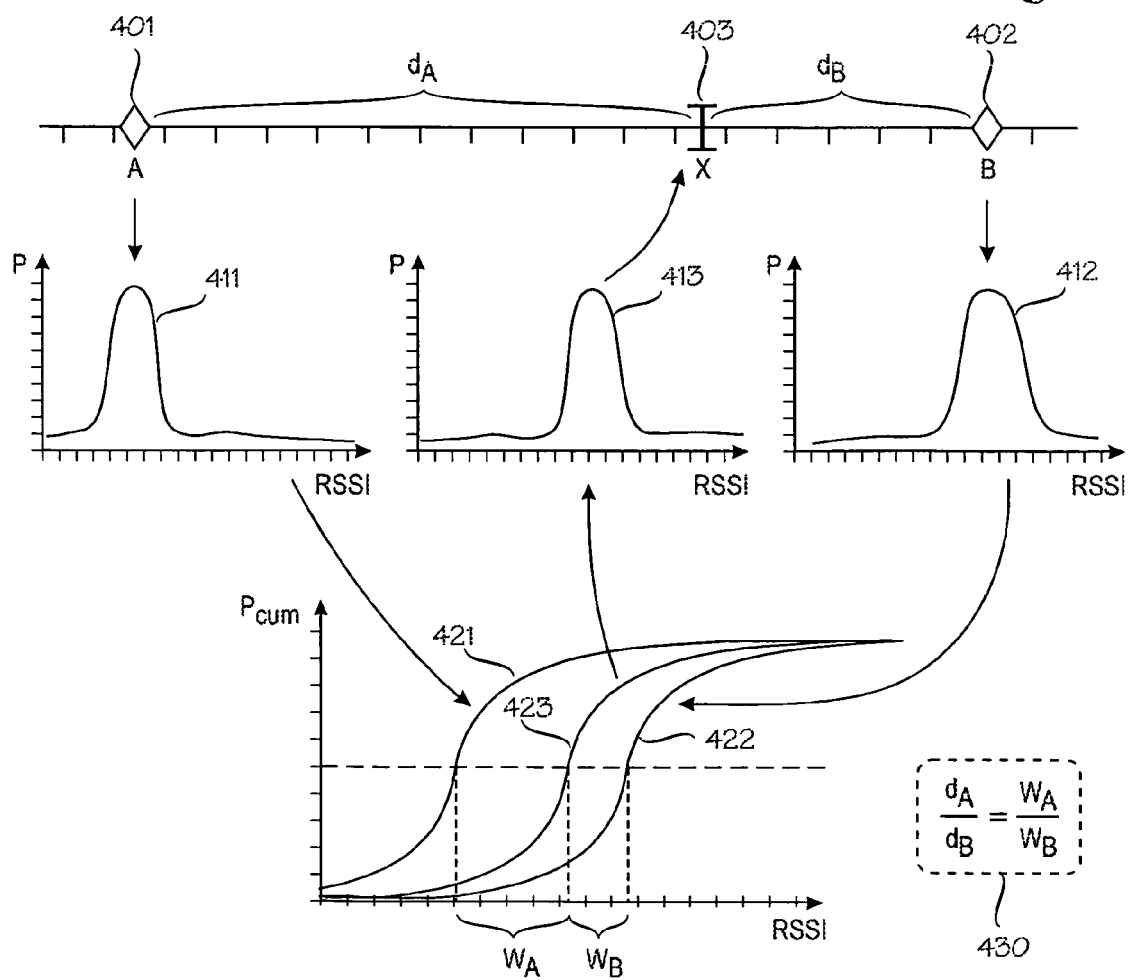
FIG. 4 illustrates a technique for determining probabilities for the particles based on a probabilistic model of the environment.

FIG. 4 illustrates a technique for determining probabilities for the particles based on a probabilistic model of the environment. In FIG. 4, two sample points A and B are denoted by respective reference numerals 401 and 402. Reference numerals 411 and 412 denote respective probability distributions for the two sample points A and B. However, in most positioning environments, a typical distance between sample points is impractically large, and the resolution of the positioning technique must be enhanced by interpolations between the sample points. In FIG. 4, reference numeral 403 denotes a location X between the two sample points A and B. Intuitively, one would think that the probability distribution for location X can be obtained by interpolating between the probability distributions 411, 412 for the sample points A and B. But a straightforward summing or averaging of the two probability distributions 411 and 412 results in a curve which has a separate peak at each of the two sample points A and B. Such a result is apparently false because the probability distribution for location X obviously should have a peak at the location X.

Reference document 2 (commonly assigned patent application WO03/102622) discloses techniques for interpolating probability distributions between two or more sample points. Reference document 2 describes interpolation techniques which are based on combining cumulative distributions of the two or more sample points, instead of combining the probability distributions. A cumulative distribution and a probability distribution can be derived from each other. But the techniques disclosed in reference document 2 are applicable when the location to be interpolated is known, and in the context of the present invention, the precise location of the target object is unknown, even if in some cases it is possible to determine that the target object is located somewhere between two known sample points. In the context of the present invention it is not immediately apparent how meaningful interpolations between any two (or more) sample points can be made, considering the fact that the target object's location is unknown and, consequently, any factors for combining the probability distributions for the sample points are unknown.

Accordingly, the embodiment described in connection with FIG. 4 is partially based on the realization that even if the location of the target object is unknown, the locations of the particles are known, although any location estimation apparatus doesn't know how far off from the target object's true location the particles are.

Based on the above realisation, the location estimation apparatus may place a particle in location X, 403 and determine the probability distribution for that location as follows. The distances from the location X, 403 to the sample points A and B are $d_A$ and $d_B$, respectively. As stated above, the probability distributions for the two sample points A and B are denoted by respective reference numerals 411 and 412. In the example shown in FIG. 4, the measurable, location-dependent variable is RSSI (received signal strength indicator), but RSSI is only provided as a non-restricting example. The probability distributions 411 and 412 and converted to respective cumulative distributions 421, 422. The cumulative distribution 423 for location X can be determined by the following algorithm: for each of several values of the dependent variable $P_{cum}$, the value of the independent variable RSSI is determined by weighting with appropriate weights the cumulative distribution functions 411 and 412 of the sample points A and B, respectively. In FIG. 4, quantities $W_A$ and $W_B$ denote, for any point on the cumulative distribution 423, the horizontal distances from the cumulative distributions 421 and 422. Reference numeral 430 denotes an equation which must be satisfied by the quantities $d_A$, $d_B$, $W_A$ and $W_B$. Further techniques, such as techniques for interpolating between three sample points which are not along a common straight line, are disclosed in reference document 2.

The probability distributions 411 and 412 should not be confused with the probabilities 113, 123, . . . , and 213, 223, . . . , discussed in connection with FIGS. 1 and 2. The probabilities in FIGS. 1 and 2 are probabilities for a given particle to be the true location of the target object. The probability distributions 411 and 412 shown in FIG. 4 indicate the probability for a measured signal parameter to have a given value (if the measurements are treated as discrete values) or to lie within a given range (if the measurements are treated as continuous values). The probability distributions 411 and 412 are used to calculate the probabilities 113, 123, . . . , and 213, 223, but the two different probabilities should not be confused with each other.

Topology Models

FIGS. 5A to 5D show various implementations and applications of topology models TM which indicate permissible locations and/or transitions within the environment. Reference numeral 500 denotes an embodiment of the topology model which models the room layout 501 shown on the left-hand side of FIG. 5A. The room layout 501 comprises three small rooms 503, 504 and 505 and a large room 506 which are accessible via a corridor 507. In this particular example, the large room 506 is treated as four sections 506A to 506D. The topology model 500 indicates permissible locations and transitions within the environment (room layout) 501. Any room number in the topology model 500 indicates a permissible location and any row indicates a permissible transition. In this example all permissible transitions are assumed bi-directional, which means, for example, that the first row indicates that 503 to 507 and 507 to 503 are both permissible transitions.

Figure 5A:
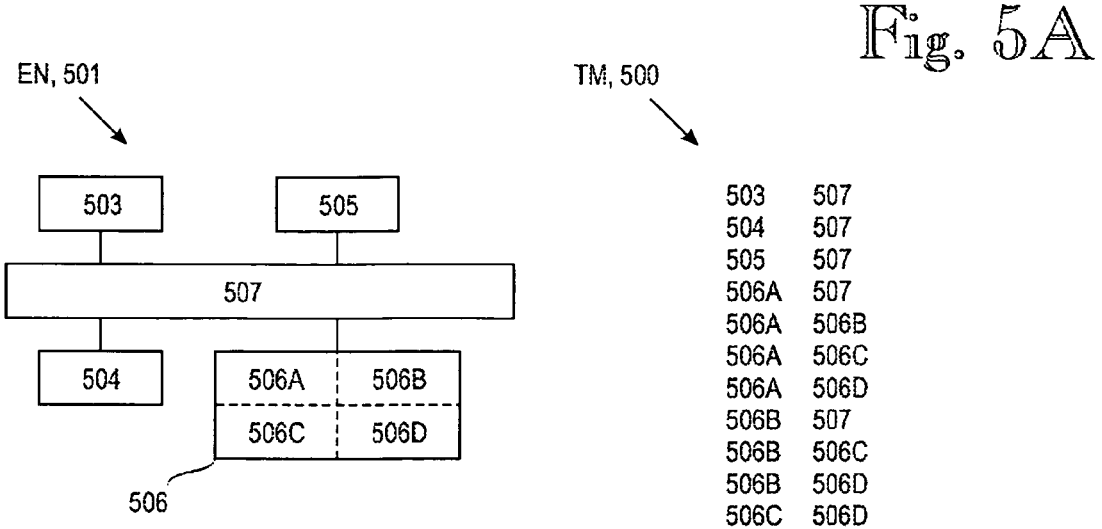
FIGS. 5A to 5D show various implementations and applications of topology models which indicate permissible locations and/or transitions within the environment.

It is worth noting that the embodiment 500 shown in FIG. 5A is entirely based on conventions (room numbers) and no metrics, such as a coordinate system, is used. Such a convention-based topology model can be used in museums or exhibitions, for example. When a guest enters one of the rooms 503-505 or a section 506A-506D of a larger room, his/her portable apparatus may display or read out a description of the items displayed in that room or room section. Providing a visual or audible description of exhibition items is an example of useful location-dependent services in which the actual location is concealed from a service-requesting entity or application.

Figure 5B:
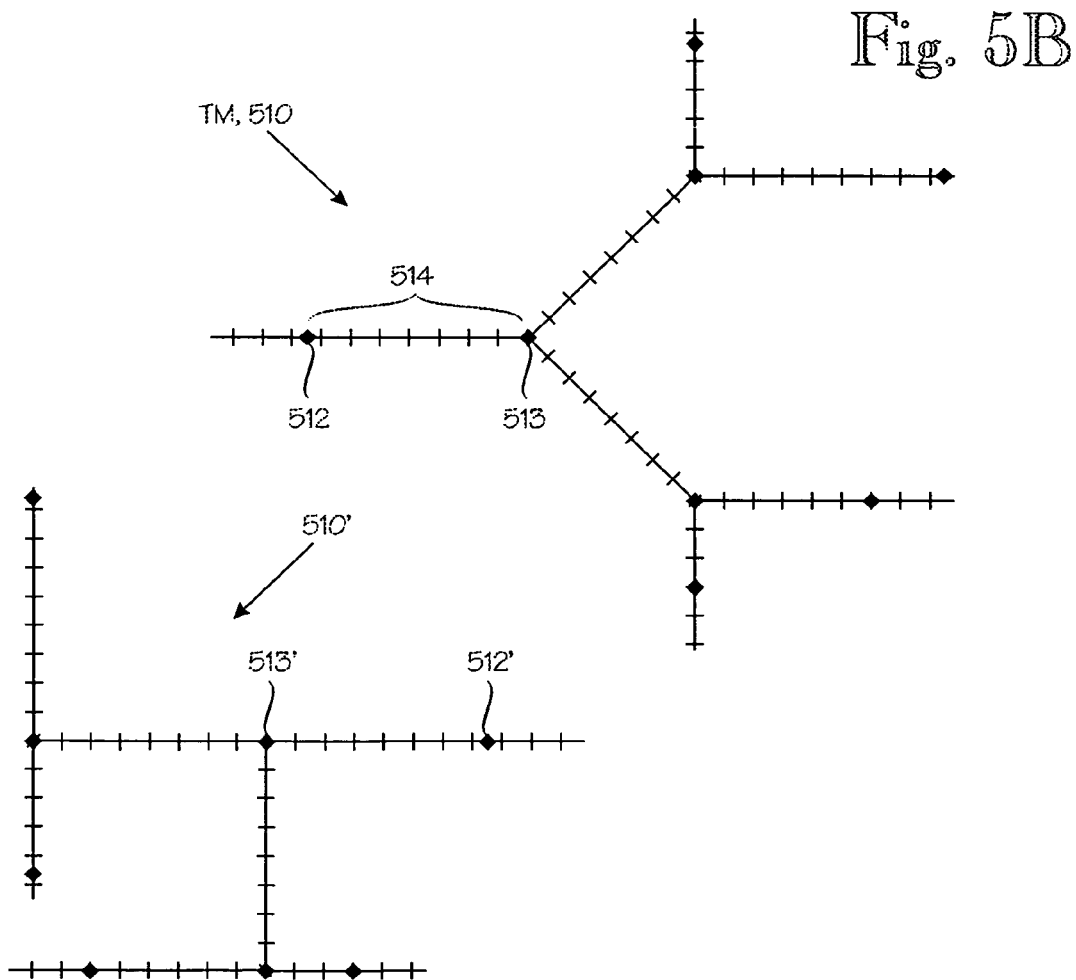

FIG. 5B shows a topology graph 510, which is another implementation of the topology model TM. The graph 510 comprises a set of nodes and a set of arcs, wherein each node indicates a permissible location and each arc indicates a permissible transition. Black rectangles, two of which are denoted by reference numerals 512 and 513, represent the nodes. In this implementation the arcs, one of which is denoted by reference numeral 514, are direct line segments connecting the nodes 512, 513, but in other implementations, the arcs may be defined by more complex curves. Each node is a permissible location for the target object, but the nodes are not necessarily the only permissible locations. In some implementations any point along any arc between any two nodes is a permissible location. In other implementations, any location whose distance to the graph is less than a predetermined margin (one half of a minimum corridor width, for example) is a permissible location.

The topology graph 510 may or may not have an associated metrics. Without any metrics, the topology graph 510 is logically equivalent to the topology model 500 shown in FIG. 5A, such that the nodes 512, 513 of the graph 510 correspond to the rooms 503-507 of the model 500. The metrics, if used, may be relative or absolute. A relative metrics may indicate that the graph comprises nodes 512 and 513 and that the distance between them is 7.5 units. An absolute metrics may indicate the coordinates of the nodes. If a relative metrics is used, the topology graphs 510 and 510' are equivalent graphs in the sense that the absolute coordinates of the nodes is irrelevant.

There are many ways to use the topology graph 510 in determining a target object's location. For instance, the movement of the particles may be confined to permissible locations. The set of permissible locations comprises the nodes of the graph 510, and, optionally, the arcs or any locations which are at most a predetermined margin from the arcs.

Figure 5C:
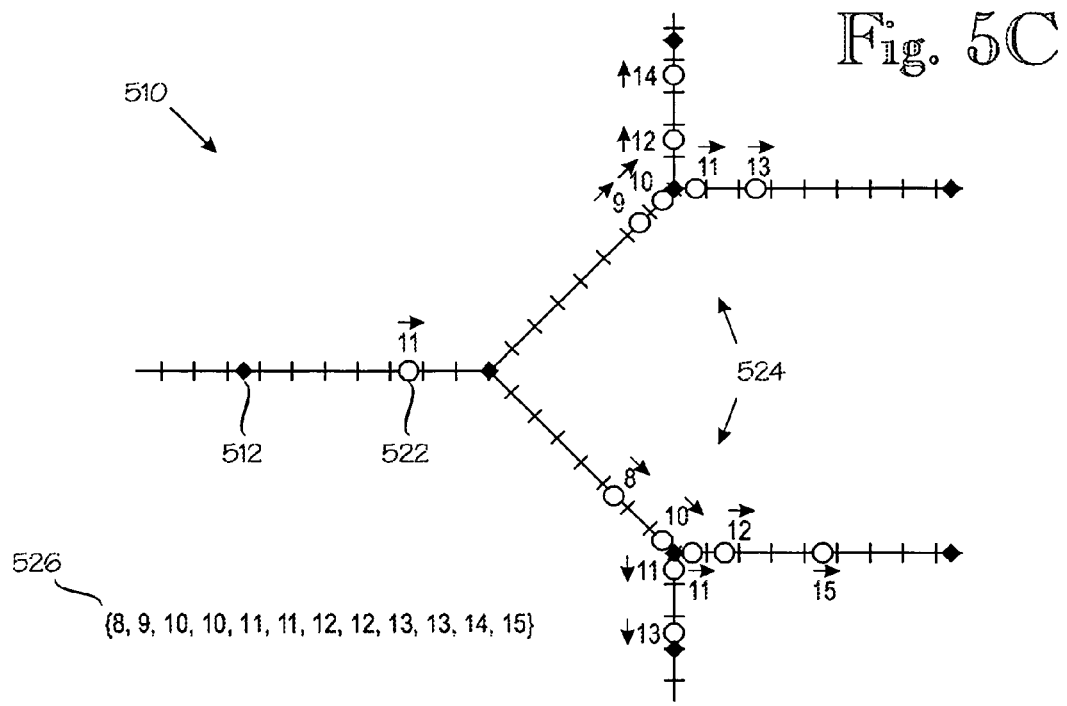

FIG. 5C shows a scenario in which the movement of the particles is confined to the nodes and arcs of the graph 510. Reference numeral 522 denotes one particle with an associated velocity of 11 units to the right. Let us assume that the particle 522 has 12 descendants which are collectively denoted by reference numeral 524. Reference numeral 526 denotes the set of velocities (as scalar values) of the 12 descendants. Each unit of velocity corresponds to a distance of one tick mark between two consecutive update cycles. FIG. 5C shows one example of distributing the set of 12 descendants 524 along the graph 510 which is one of many possible implementations of the topology model TM. The example shown in FIG. 5C is based on the assumption that each branch is equally probable. But sometimes the concept of motion models (item MM in FIG. 3A) may be used to eliminate some of the options. For example, the location-estimation module LEM may have a priori knowledge that a given target object moves on wheels. If one of the branches in the graph is a stairway, such a branch is impossible to a target object moving on wheels. Obviously, no or at most very few particles should be assigned to impossible branches.

Figure 5D:
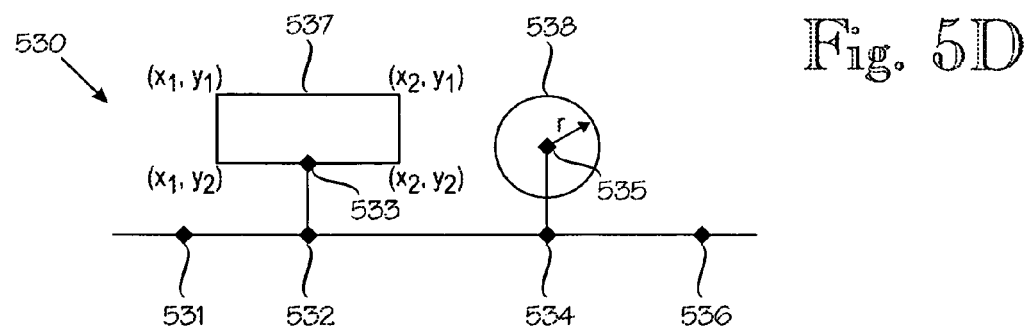

FIG. 5D shows a topology model 530 which comprises nodes 531-536 and regions which are attached to some of the nodes. In the topology model 530, the permissible locations are the nodes 531-536 and, optionally, any point along the arcs between the nodes, plus any point within the two regions which are defined by coordinates. A polygon 537, defined by coordinates $(x_1, y_1)$, $(x_2, y_1)$, $(x_1, y_2)$, $(x_2, y_2)$, is attached to node 533. Or, if the polygon is a rectangle, the coordinates $(x_1, y_1)$, $(x_2, y_2)$ suffice to define it. A circle 538 with radius r is attached to node 535. The data structure defining the topology model 530 may comprise the coordinates of the nodes 531-536 and the types and coordinates defining the regions 537, 538.

For further examples of the use of topology graphs, the reader is directed to commonly-owned patent application WO2004/008795 which discloses techniques for interpreting the location of a target object by means of a topology model, whereas the present invention proposes using such graphs to position particles assigned to a target object.

Motion Models

Figure 6:
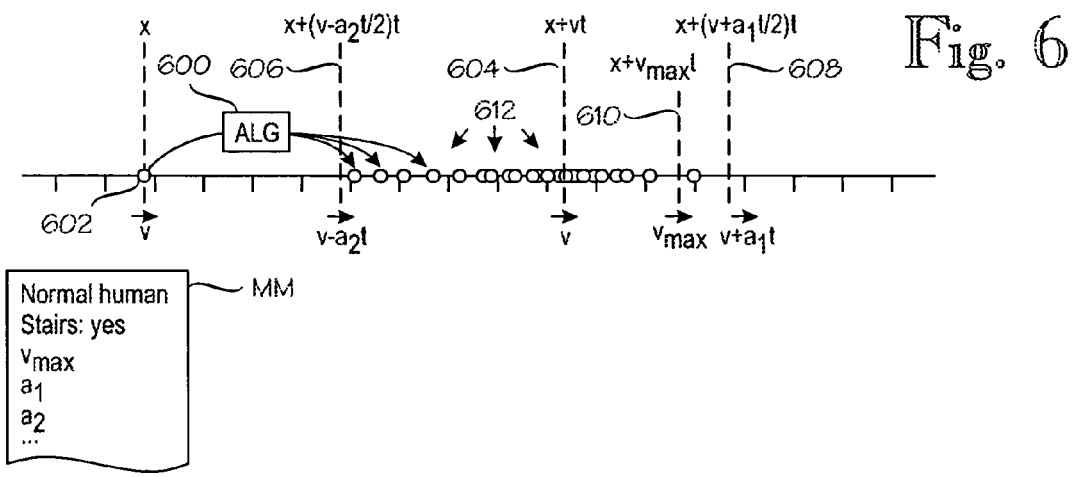
FIG. 6 illustrates how motion models can be used to derive a set of descendent particles from a parent particle.

FIG. 6 illustrates how motion models can be used to derive a set of descendent particles from a parent particle. To keep FIG. 6 simple, location is shown as single-dimensional, but in practical implementations, location can be treated as multi-dimensional, or the topology model described in connection with FIGS. 5A-5D can be used to treat a multidimensional space as a family of alternative single-dimensional paths.

Reference numeral 602 denotes a particle assigned to a target object. The particle 602 is located at coordinate x. A motion model MM for the target object indicates a type of 'normal human' who is able to move in stairways, etc. The motion model MM indicates a maximum velocity of $v_{max}$, maximum acceleration of $a_1$ and maximum deceleration of $a_2$. Other implementations of motion models may also indicate probabilities for changes in velocity (magnitude and direction). Such probabilities for change in velocity may indicate, for example, that sharp turns at high speeds are highly improbable.

Reference numeral 604 indicates a location for the descendent particle of particle 602, assuming constant speed. This location is at coordinate x+vt; wherein t is the lifetime of one generation of particles, ie, the period of time from the creation of a particle to the creation of its descendent particle. Reference numeral 606 denotes a location for the descendent particle of particle 602, assuming maximum deceleration. This location is at coordinate $x+(v-a_2t/2)t$. Reference numeral 608 denotes a location for the descendent particle of particle 602, assuming maximum acceleration. This location is at coordinate $x+(v+a_1t/2)t$. In the scenario shown in FIG. 6, this location will not be output by the motion model MM because, in this example, the maximum acceleration during time t would have resulted in exceeding the maximum velocity $v_{max}$, as indicated by line 610, which is at location $x+v_{max}t$.

Thus, all or most of the descendent particles 612 of particle 602 are distributed between locations 606 and 610. For instance, the descendent particles 612 may be distributed between the boundary locations 606 and 610 by a pseudorandom algorithm 600 which distributes the descendent particles 612 by using some appropriate distribution, such as a normal distribution or even distribution. There is a residual probability for generating a small portion of the descendant particles 612 outside of the area defined by locations 606 and 610, because the target object may not comply with the constraints of the motion model MM being applied. For example, the location-estimation module may have incorrectly determined the type of the target object. Or, in the case of normal humans in hospitals, the maximum velocity $v_{max}$ may correspond to walking, but the possibility of running cannot be ruled out entirely.

Figure 7:
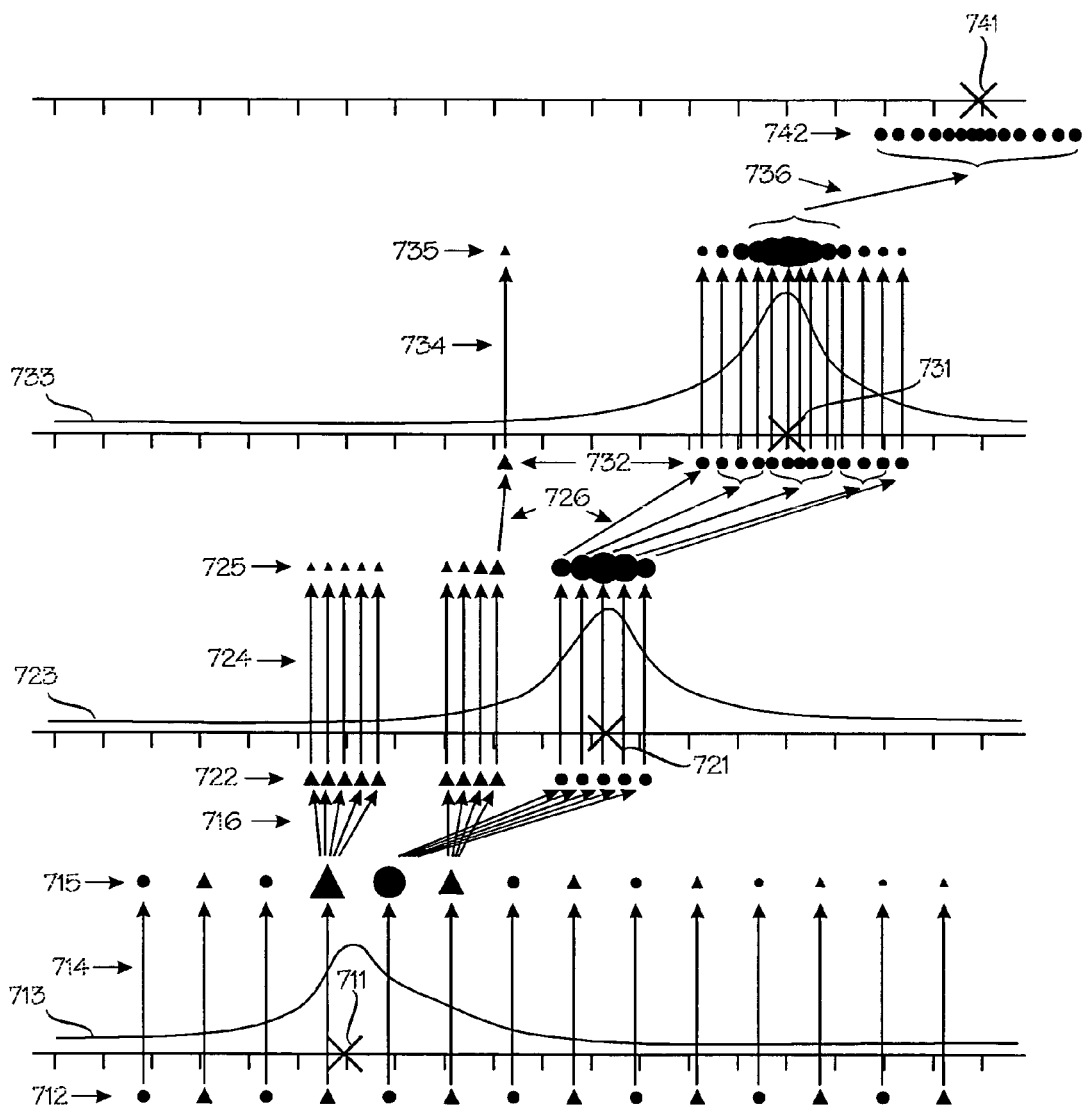
FIG. 7 illustrates an embodiment in which multiple different motion models are initially assigned to a target object.

FIG. 7 illustrates an embodiment in which multiple different motion models are initially assigned to a target object. Reference signs MM1 and MM2 denote two different symbols indicating particles associated with two different motion models. The two motion models MM1 and MM2 may differ from each other in several respects, but for the purposes of FIG. 7, it suffices that motion model MM1 describes the motion of a slow object while MM2 describes the motion of a fast object.

Particles associated with motion models MM1 and MM2 are indicated by a triangle and circle, respectively. The size of a triangle or circle indicates the particle's weight after the weight-determination step.

The manner in which FIG. 7 uses reference numerals and presents a time span of four update cycles is largely analogous to the manner used in FIGS. 1 and 2. Reference numeral 711 denotes the target object's initial location. Reference numeral 712 denotes a set of particles initially assigned to the target object. In this example, 7 of the 14 initial particles 712 (the triangles) are associated with the slow motion model MM1, while the remaining 7 (the circles) are associated with the fast motion model MM2. Reference numeral 713 denotes a curve which indicates probabilities for 14 different locations. Reference numeral 714 denotes a first weight-determination step which results in a set of weighted particles 715. Reference numeral 716 denotes a first descendent-generation step. In this somewhat simplified scenario, only three particles have any descendents in the second generation. The shape of the probability curve 713 is such two of the three particles chosen as parents happen to be associated with the slow motion model MM1 (triangles), and these two particles have a total of nine descendents in the set of descendent particles 722. In this example, only one "fast" particle is selected a parent for the descendent particles 722, and this particle has five descendents.

In this example the initial random assignment of motion models is such that it happens to favour the slow motion model MM1. But the target object turns out to be a fast one, ie, an object best modelled by the fast motion model MM2. Reference numeral 721 denotes the target object's next location while reference numeral 723 denotes the probabilities for the locations of the particles 722. Reference numeral 724 denotes the second weight-determination step whose result is a second set of weighted particles 725. In the set of descendent particles 722, the "fast" particles (circles) are located near the peak in the probability curve 723. Accordingly, they will be weighted heavily in the second weight-determination step 724 and receive many descendents in the second descendent-generation step 726. Conversely, the "slow" particles (triangles) predict the target object's movement poorly and tend to be located away from the probability peak in the curve 723. Accordingly, they will receive low weights and generate few descendents in the second descendent-generation step 726.

Reference numerals 731 to 736 relate to the following update cycle (weighting and descendent-generation steps), whose output is a fourth set of particles 742, all of which are associated with the fast motion model MM2.

To enhance the clarity of FIG. 7, the scenario shown in it is simplistic in the sense that velocity is treated as a scalar attribute. In a real-life scenario, velocity could be treated as a vector attribute.

As shown in FIG. 7, even if the initial random assignment of motion models happens to favour the incorrect slow motion model MM1, the particles associated with it soon die out and all remaining particles are associated with the fast motion model MM2. But it may turn out that the events shown in FIG. 7 are exceptional, and the slow motion model MM1 might in fact have been better in the long run. But if all remaining particles are associated with the fast motion model, it is unlikely that the remaining particles will be very good at predicting the target object's future movements. It is possible to avoid such total extinctions of attributes which are temporarily bad but potentially good in the long run, by generating "fresh", ie parentless, particles at least in some generations. Alternatively, some particles may be descendents of particles in a previous generation but heavily mutated. In other words, some particles' attributes may be subjected to strong variations.

Figure 8:
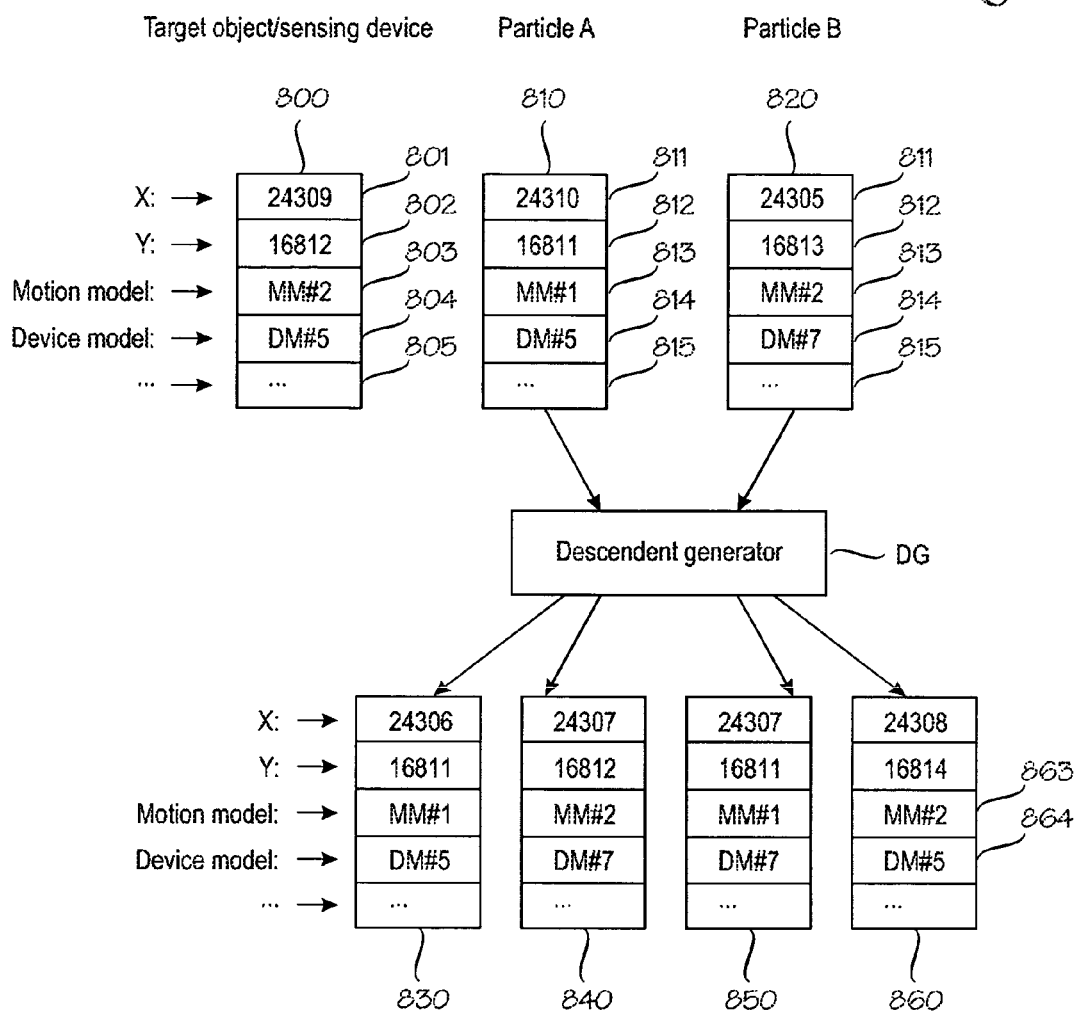
FIG. 8 illustrates an embodiment in which a descendent particle inherits attributes from multiple parent particles.

FIG. 8 illustrates an embodiment in which a descendent particle inherits attributes from multiple parent particles. Reference numeral 800 denotes a set of target object properties. Reference numerals 801 and 802 denote the target object's X and Y coordinates, respectively. Reference numeral 803 denotes an indication of an optimal motion model (MM#2=motion model number 2). Reference numeral 804 denotes an indication of an optimal device model (DM#5=device model number 5). Reference numeral 805 denotes further properties which are beyond this description. Thus the attribute set 810 of particle A indicates an optimal device model (DM#5) and the attribute set 820 of particle B indicates an optimal motion model (MM#2), but neither particle's attribute set indicates a perfect combination of device and motion models.

Reference numerals 810 and 820 denote attribute sets of two particles A and B assigned to the target object. Each particle has a corresponding attribute for each of the target object's properties to be estimated. The particles A and B (or their attribute sets 810, 820) are applied as inputs to a descendent generator logic or circuitry DG which may be part of the location estimation apparatus shown in FIG. 3. In this example, the descendent generator DG selects two (or more) particles sufficiently close to each other as common parents to a set of descendent particles. Let us assume that the combined weight (e.g. sum or product of the weights) of the particles A and B is such that they have four descendent particles which are denoted by reference numerals 830, 840, 850 and 860.

According to one implementation, the descendent generator DG derives the X and Y coordinates of the descendent particles 830, 840, 850 and 860 by determining the average values of the parent particles 810 and 820, and adding small (pseudo) random variations to the average values. Alternatively, the descendent generator DG may operate such that the descendent particles inherit various combinations of the parent particles' attributes.

As shown in this example, the descendent generator DG causes the four descendent particles 830, 840, 850 and 860 to inherit various combinations of the device model and motion model indications in the attribute sets of the parent particles 810, 820. Descendent particle 830 has neither model correctly, particle 840 has the correct motion model but an incorrect device model, particle 850 has the correct device model but an incorrect motion model, while particle 860 has both models correctly. Because the attributes of particle 860 indicates an optimal device model and an optimal motion model for the target object, it has the best chance to survive an have descendents in future generations.

FIG. 8 shows a scenario in which the descendent particles 830, 840, 850 and 860 are derived from two common parent particles, but the number 2 is only an illustrative example, and the number of parent particles may vary, even within a single generation. Some descendent particles may have one parent particle while some have two or more.

FIG. 8 shows an embodiment in which the descendent generator DG processes (receives and outputs) various combinations of identifiers of the device models and motion models. Instead of applying identifiers of the device models and motion models, it is also possible that the descendent generator generates modified parameters of the device and/or motion models. For example, the descendent generator may produce a descendent particle from three parent particles whose device models have correction parameters of −2, +3 and +5. For example, these values may indicate values to be added to signal strength observations either throughout the RF spectrum or in some band of the spectrum. The average value of these three correction parameters is +2, which the descendent generator may use as a starting value for the next generation of particles.

Confidence Measures

In some applications, it is necessary or at least beneficial to know how reliably a target object can be located to a given location or area. A confidence measure provides a measure of positioning certainty. In one embodiment of the invention, the spatial distribution of the particle set is used to determine the confidence measure. In one reasonably simple implementation, the probability for a target object to be located in an area A is the ratio of the target object's particle set in the area A to the total number of particles assigned to that target object. In another implementation, the confidence measure is based on the sum of probabilities of the target object's particles in the area A divided by the sum of probabilities of all particles assigned to that target object. In yet another implementation, the confidence measure may be based on the particles' ability to predict subsequent observations, such as signal values.

Figure 9:
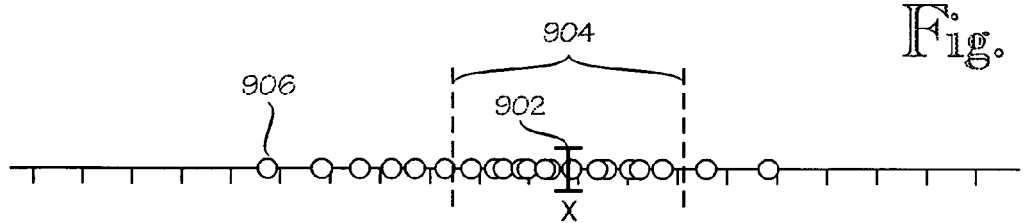
FIG. 9 illustrates a technique for determining confidence measure in respect of a target object's location estimate.

FIG. 9 illustrates a technique for determining confidence measure in respect of a target object's location estimate. Reference numeral 902 denotes the target object's estimated location. Reference numeral 904 denotes an area or line segment which constitutes a subset of the possible locations for the target object. Reference numeral 906 collectively denotes the set of particles assigned to the target object. In one implementation, the ratio of the number of particles in the area 904 to the total number of particles assigned to the target object is used as a confidence measure. In an alternative implementation the confidence measure is based on the ratio of probability-weighted particles, such as the ratio of the combined probability within the area 904 to the combined probability of all particles assigned to the target object.

The same technique for determining a confidence value can be used with other attribute values, such as velocity.

Figure 10:
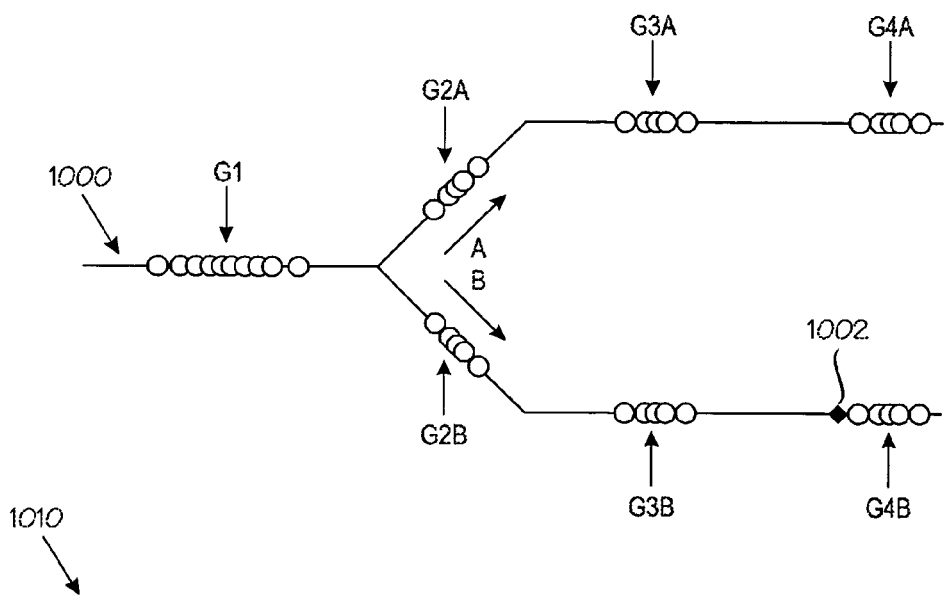
FIG. 10 shows how information on a particle set's future may be used to reduce uncertainty concerning its past.

FIG. 10 shows how information on a particle set's future may be used to reduce uncertainty concerning its past. Reference numeral 1000 denotes a fragment of a floor plan or topology model. For the interest of clarity, FIG. 10 shows only 10 particles assigned to a target object. The particles evolve in four generations G1 to G4. Between the first and second generations G1 and G2, the particles are split between two possible branches A and B, and the two halves of generations are denoted by 'A' and 'B' appended to the number of the generation. Table 1010 shows the sum of weights for the particle groups shown in FIG. 10. Group G1, which exists before the split, contains all particles of the first generation, whereby the combined (normalized) weights is one. Group G2A, ie, the A branch of generation G2, has a combined weight of x, whereby the combined weight for the B branch G2B must be 1−x, assuming that the all particles are assigned to either branch A and B, and none turns back at the junction. At the third generation, the combined weights of the particles on the A and B branch are y and 1−y, respectively. The example shown in FIG. 10 illustrates a case in which the branches A and B are initially equally probable, whereby the each of the weights x, 1−x, y and 1−y are 50% or close to it. In this example, the target object passes by node 1002. At this point the target object's location can be determined with virtual certainty. For example the node 1002 may be a point, such as a checkout point, at which the target object's location can be determined by some independent means. Accordingly, the A branch which the target object apparently did not take, has a residual weight of ε which is zero or close to zero, while the B branch obtains a combined weight of 1−ε. When the branch taken by the target object is known with certainty, the combined weights for the previous generations can be amended, as shown on the last line of table 1010. Such non-real-time correction of confidence measures can be used to identify paths taken by target objects, for example.

In the example shown in FIG. 10, one can say that the set of particles in one generation constitutes a snapshot of the particles.

Performance Considerations

Any technique for estimating the location of one or more target objects by observations of location-dependent physical quantities is computationally exacting, and the present invention is no exception. However, the present invention can provide computational benefits when the number of sample points is large compared with the number of particles per target object. There are several reasons for this. For example, it is often necessary to store a target object's motion history with associated probabilities. Many prior art positioning techniques implement hidden Markov models (HMM). In an HMM system, storing the target object's motion history involves storing a number of prior states, and storing each state involves storing data for a huge number of sample point probabilities. In the present invention, storing a motion history can be accomplished by storing a history of the particles whose number can be significantly lower than the number of sample points.

In addition, the present invention improves robustness in cases where a centralized location-estimating apparatus has to serve a large number of target objects. Assume a scenario in which the target objects make signal parameter observations at a first rate, such as once per second. The centralized location-estimating apparatus is overloaded and can update location estimates more slowly, say once for each three seconds. The particles according to the invention can maintain their movements until the location-estimating apparatus has time to update them. In known HMM systems, it is much more error-prone for the location-estimating apparatus to skip calculating a location estimate. This is because many HMM models are based on known transition probabilities between sample points (or other given locations), and if the interval between location-estimating cycles is increased, the number of possible transitions becomes extremely large, which eliminates most of the computational advantages of performing location-estimating cycles less frequently.

This is not to say that the present invention and HMM models are mutually exclusive; rather many benefits of the invention are highest when implemented in a continuous system without the discrete nature inherent in the states of HMM models.

In some embodiments of the present invention, the location estimation apparatus may consider the amount of time available for computing a location estimate, and if the available time decreases below a critical threshold, the location estimation apparatus may take appropriate measures. For instance, it may reduce the number of particles per target object. The reduction of particles may be even across the target objects, or it may depend on further considerations. For example, target objects which move rapidly and/or which are not easily explained by any of the motion models may be assigned more particles than target objects which stand still or which conform well to some motion model. In time-critical situations, the location estimation apparatus may also skip particle updating cycles and, optionally, allow the existing particles to move as determined by the motion model(s).

Relevant Sample Points

Another technique to avoid computations which serve no useful purpose involves selecting a subset of the sample points of the data model, based on some relevance criteria. Such selected sample points will be called relevant sample points. For instance, the relevant sample points technique can be used by complementing the invention with the following steps:

- maintaining a set of relevance indicators for indicating one or more sets of relevant sample points, wherein the one or more sets of relevant sample points are subsets of the sample points in the data model;
- based on the observations at the target object's location and the set of relevance indicators, determining a current set of relevant sample points; and
- estimating the target object's location based on the observations at the target object's location and on the current set of relevant sample points.

A benefit of this technique is that sample points not included in the current set of relevant sample points can be omitted from calculations, which reduces the computational load and the battery drain. Alternatively, the resources saved by the inventive technique can be used to obtain a more accurate or more secure position estimate by further computations.

In some embodiments of the invention, the relevant sample points technique is used to improve computational efficiency. The data model may indicate a set of expected values of physical quantities for each sample point and the method further comprises maintaining a set of relevance indicators for indicating one or more sets of relevant sample points, the sets being subsets of the sample points in the data model. Based on the observations of the one or more of the location-dependent physical quantities and on the set of relevance indicators, a current set of relevant sample points is determined and used to increase computational efficiency. For instance, particles located far from the current set of relevant sample points can be discarded. Instead of discarding such distant particles or in addition to it, step a) of the inventive method may further comprise assigning a minimal degree of belief to particles far from the current set of relevant sample points without further calculations. Also, step c) of the inventive method may further comprise generating some additional parentless particles near the relevant sample points.

The expected signal values at that sample point may be scalar values, probability distributions (eg normally distributed), histogram structures, or the like. The relevant sample points technique comprises determining a set of relevance indicators for indicating a set of relevant sample points, which set is a subset of the sample points in the data model. This step will be further described in more detail later. The observations at the target object's location and the set of relevance indicators are used to determine a current set of relevant sample points. The target object's location is estimated based on the observations at the target object's location and on the current set of relevant sample points.

In one embodiment, the step of determining the current set of relevant sample points comprises selecting sample points whose set of expected values of the physical quantities span the observations at the target object's location with a predetermined relevance criterion.

In another embodiment the predetermined relevance criterion is relaxed if the resulting set of relevant sample points is smaller than a predetermined minimum size. Such a condition may indicate an anomaly, whereby an alarm should be triggered, particularly if the anomaly is persistent. In some embodiments the relevance criterion is adjusted depending on system load. The higher the system load, the stricter the relevance criterion, and vice versa.

Yet another embodiment comprises forming a topology graph that models the topology of the environment, wherein the topology graph indicates a set of nodes and a set of arcs, such that each node indicates a permissible location and each arc indicates a permissible target object transition between two nodes. The topology graph is used to estimate the target object's location. For example, the topology graph may be used to record the target object's motion history and to exclude some of the selected sample points based on the target object's motion history.

The observations of the target object (or sensing device(s) attached to the target object) are not necessarily raw measurement data but any values derived from the measurement data. For instance, the observations may be derived from the measurement data by mathematic processing, such as smoothing. In addition, some embodiments of the invention make use of device models to correct the observations of the sensing devices. This feature is particularly useful in applications wherein the sensing devices are not specifically designed for accurate measurements.

In some embodiments of the invention, a priori information on an optimal device model for a sensing device is not available, and the relevant sample point technique is used to select the best device model. This method is based on a discovery that when the signal values are highly corrupted or biased, the number of relevant sample points tend to be very small or even zero. On the other hand, if the observed signals correspond well to the data associated with the sample points, the number of relevant sample points is high.

Thus, if the act of applying a device model increases the number of relevant sample points, we can conclude that the device model is able to eliminate some of the device-specific bias. An optimally selected device model is one which maximises the number of relevant sample points. Accuracy of the device model selection can be further improved by analyzing a series of observations. For example, one could select the device model for which the average number of relevant sample points over the series of observations is the highest.

Figure 11A:
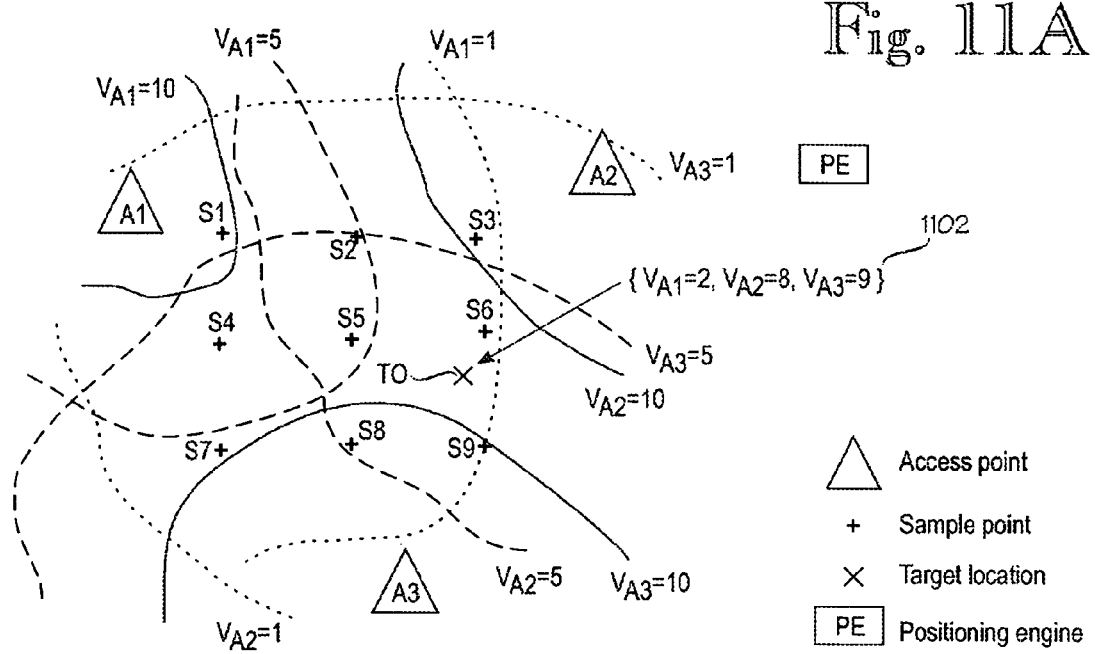
FIG. 11A shows a target object and a section of a radio network with three access points, and a number of sample points.

FIG. 11A shows a target object and a section of a radio network with three access points, and a number of sample points. Triangles marked A1 to A3 denote the three access point. Plus signs marked S1 to S9 denote nine sample points of a data model which models signal parameter values, such as signal strength, in the radio network. Reference sign TO denotes the location of the target object. Depending on context, the reference sign TO may refer to the target object itself or its location. The location of the target object is unknown when positioning begins and only an estimate when it is completed. Reference numeral 1102 denotes a set (vector) of RF signal parameter observations made by the target object TO. In this example the observed values of the signal parameter, such as signal strength, at access points A1, A2 and A3 are 2, 8 and 9, respectively. The target object TO is positioned by a positioning engine PE, which may be located in the target object itself in some embodiments. But the resource-saving features of the invention are best utilized when a large number of target objects are positioned by a common positioning engine. In a typical implementation, the positioning engine is a data processing equipment, such as a server or a set of servers, which comprises a data model of the positioning environment, means for receiving signal parameter observation at the target object's location and means for carrying out the method according to the invention.

Figure 11B:
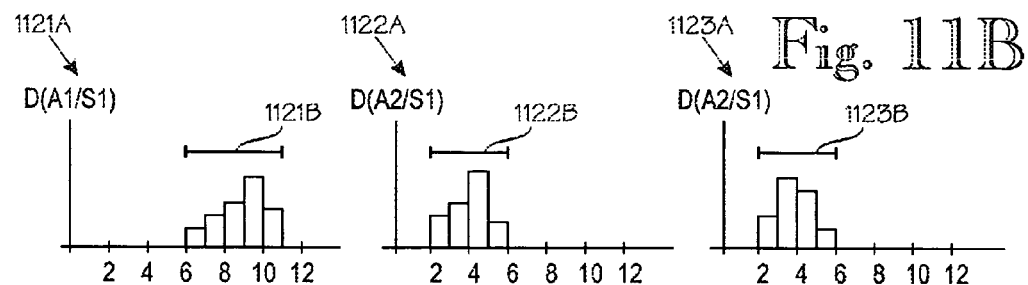
FIG. 11B shows ranges of possible signal quality values for one sample point and three access points.
Figure 11C:
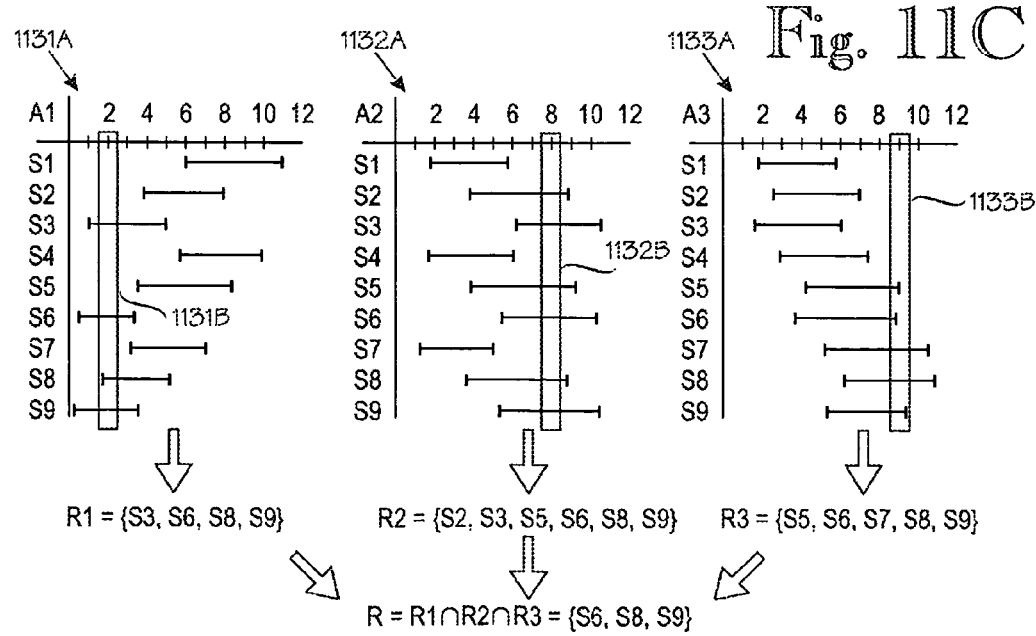
FIG. 11C shows a process of obtaining a set of relevant sample points.

For purposes of illustration, FIG. 11A also shows, for each of the three access points, three lines of equal signal parameter values. These equal-value lines show locations at which the signal value of the access points are 10 (innermost line), 5 (middle line) and 1 (outermost line). These lines are shown only for a better understanding of the invention; they are not used for any computations. FIGS. 11A to 11C depict the signal parameters as simple scalar values between 0 and 12, in order to make the illustration easily understandable to human readers. In a real-life scenario, the signal parameter values could be signal strengths expressed in dBm units, for example.

FIGS. 11B and 11C collectively show an exemplary set of relevance indicators for indicating sets of relevant sample points.

FIG. 11B shows ranges of possible signal quality values for one sample point, namely S1, and the three access points A1 to A3 shown in FIG. 11A. In the embodiment described here, the signal parameter values are treated as discrete values. Of course, any digital measurement system produces "discrete" values, but as used herein, "discrete" implies that the range of possible values is processed as a relatively small number of bins instead of a virtual continuum of digital numbers. It should be understood that a precise definition of "discrete" is not essential, since the invention is applicable to techniques in which the possible signal quality values are considered continuous (non-discrete).

FIG. 11B relates to an embodiment in which the data model is a probabilistic model. A probabilistic model indicates probability distributions for measurable physical quantities, which in this example are signal parameter values. Reference numeral 1121A illustrates probability distribution of signal parameter value from access point A1 at sample point S1. In a typical but non-restricting implementation, it means the probability distribution of the signal strength of the signal from A1 at sample point (location) S1. This quantity is denoted by D(A1/S1). The signal strength distribution can be determined by actual measurements, computer simulations or any combination of such techniques.

Horizontal bar 1121B denotes a range of possible signal parameter values for the combination of A1 and S1. A signal parameter value is considered possible if it has a probability which deviates from zero by a statistically significant margin. The question of statistical significance involves a compromise between calculation optimization and accuracy/reliability. If the required margin is high (signal values are accepted only if they have a "very" high probability), then only a small number of sample points will be considered relevant and the savings in computational resources are large. On the other hand, there is a risk of ignoring a sample point that might affect positioning.

Reference numerals 1122A and 1123A denote the corresponding distributions for the remaining access points A2 and A3, respectively. Reference numerals 1122B and 1123B denote the corresponding possible signal parameter values.

To keep FIG. 11B compact, it only shows the ranges of possible signal parameter values for one sample point (S1) and three access points (A1 to A3). In a real-life system, the ranges of possible signal parameter values should be determined separately for each sample point in the data model (database).

FIG. 11C shows a process of obtaining a set of relevant sample points. Reference numeral 1131A denotes a set of ranges of possible signal parameter values for access point A1 and each of the nine sample points S1 to S9 shown in FIG. 11A. Reference numerals 1132A and 1133A denote similar range sets for the other two access points A2 and A3. In each of the data structures 1131A to 1133A, the topmost range for sample point S1 is the same which was already shown in FIG. 11B, and the ranges for the remaining sample points S2 to S9 are determined similarly. For example, the data structure 1131A shows that the RF signal parameter value of access point A1, as seen from sample point S3, has a range of 1 to 5 (approximately).

Reference numerals 1131B to 1133B denote three value windows, one for each of the three access points. Each value window 1131B to 1133B is placed at the signal parameter value of the corresponding access point. As stated in connection with FIG. 11A, the target object observed signal parameter values of 2, 8 and 9 from the access points A1, A2 and A3, respectively. Accordingly, the value windows 1131B to 1133B are placed at positions 2, 8 and 9 in the data structures 1131A to 1133A. Initially in this description, we may assume the widths of the value windows to be one. The width will be further described later.

Now the idea is to use the data structures 1131A to 1133A and value windows 1131B to 1133B to determine a set of relevant sample points. The signal parameter value of access point A1 observed at the target object's location was 2 ($v_{A1}=2$). The range of possible signal parameter values for sample points S3, S6, S8 and S9 overlap the value window 1131B. In other words, sample points S3, S6, S8 and S9 are candidates for relevant sample points, given the observation $v_{A1}=2$. Let us denote the set of candidate sample points, given by sample point Ai, by Ri. By repeating the same procedure for the other two access points, the positioning engine determines the following sets of relevant sample points:

R1={S3, S6, S8, S9}
R2={S2, S3, S5, S6, S8, S9}
R3={S5, S6, S7, S8, S9}

The positioning engine determines these sets of relevant sample points beforehand, for each access point and signal value, stores the sets and uses them in several future positioning cycles. The stored sets can be used until the positioning environment is recalibrated (by measurements and/or simulations).

Next, the positioning engine will determine the intersection of the above three sets R1, R2 and R3 in order to determine the set of access points that are relevant given each of the three observations $\{v_{A1}=2, v_{A2}=8, V_{A3}=9\}$. The resulting set is denoted by R:

$$R = R1 \cap R2 \cap R3$$
$$= \{S3, S6, S8, S9\} \cap \{S2, S3, S5, S6, S8, S9\} \cap \{S5, S6, S7, S8, S9\}$$
$$= \{S6, S8, S9\}.$$

Thus in this example, the set of relevant sample points was reduced from nine to three. In a real-life situation, with a larger number of sample points, the reduction ratio will be considerably higher than three. The number of target objects that can be positioned by a single positioning engine will increase approximately by the same factor.

In the above description, the width of the value windows 1131B to 1133B was assumed to be fixed. However, it is preferable to begin with a relatively small width, and if the resulting set of relevant sample points is empty or too small to give reliable results, another set is determined with relaxed criteria, such as wider value windows. It is self-evident that the physical value windows have been drawn for illustrative purposes only, data processors can check the numerical values without visualization.

In this example, a mathematically simple intersection of the three sets R1, R2 and R3 was used to determine a single set of access points relevant to all three observations. This means that a sample point must be relevant to each observation in order to be relevant to the combination of observations. But real-life measurements are seldom as simple as this, and later, in connection with FIG. 14, an algorithm will be described that considers a sample point relevant even if it does not appear to be relevant for one or more observations.

In some embodiments of the invention, an alarm is triggered if a value window empirically known to be appropriate produces an empty set of relevant sample points. Such a situation can be symptomatic of a device fault in the target object itself or in one of the access points (base station transmitters). Or, the propagation characteristics of the positioning environment may have been altered by temporary blockages or by permanent changes in wall structure. Whatever the cause for the empty set of relevant sample points, the cause should be investigated.

FIGS. 12A and 12B illustrate a case in which the signal parameter values are treated as continuous values and modelled as symmetrical single-peak probability distributions. A generalization to multiple-peak and non-symmetrical probability distributions will be described in connection with FIG. 15. The following notations will be used:

$A = \{a_1, a_2, \ldots, a_n\}$ = a set of access points
$S = \{S_1, S_2, \ldots, S_m\}$ = a set of sample points
$\bar{v} = \{v_1, v_2, \ldots, v_n\}$ = a set (vector) of observed signal parameter values
$v_i$ = signal value for $a_i$
NA = value not available (out of coverage, scanning failed, ...)
$P(V|s_i, a_j)$ = probability distribution of signal parameter of $a_j$ at $s_i$
$\epsilon$ (epsilon) = parameter specifying risk that lookup ignores a relevant sample point; eg $\epsilon \in [0, 1]$ In FIG. 12A, reference numeral 1202 denotes an x-axis which represents signal parameter values observed from an access point. The y-axis 1204 represents the probability distribution $P(V|s_i, a_j)$ of signal parameter of access point $a_j$ at sample point $s_i$. The probability distribution is denoted by reference numeral 1206. This technique aims at determining one or more signal value regions such that the probability for observing a value outside the regions does not exceed a predetermined probability threshold $\epsilon$. Because the probability distribution in FIG. 12A is symmetrical and single-peaked, it is possible to determine a signal value region bound by signal parameter values $v_{min}$ and $v_{max}$ which satisfies the requirement. Reference numerals 1210 and 1212 represent the signal parameter values $v_{min}$ and $v_{max}$ respectively, such that the probability for an observed signal parameter value to be outside the range between $v_{min}$ and $v_{max}$ is $\epsilon$, and the following equations apply:

$$P(V<v_{min}|s_i, a_j)=\epsilon/2$$

$$P(V>v_{min}|s_i, a_j)=\epsilon/2$$

In other words, the minimum and maximum signal parameter values $v_{min}$ and $v_{max}$, are not absolute minimum and maximum values but values which bound the lower and higher ends of a region which contains the bulk of the probability $P(V|s_i, a_j)$. This region is indicated by hatching.

FIG. 12B shows a cumulative probability distribution 1226 which is derived from the probability distribution 1206 of FIG. 12A. In FIG. 12A, the minimum and maximum signal parameter values $v_{min}$ and $v_{max}$, denoted by reference numerals 1210 and 1212 respectively, bound a hatched region 1228 such that the cumulative probability for the signal value to be between $v_{min}$ and $V_{max}$ is $1-\epsilon$.

From the above-described probability considerations we can derive a relevance criterion for determining if a certain sample point is relevant in locating a target object which made an observation vector $\bar{v}$.

As stated above, $v_i$ = signal value for access point $a_i \in A$. Sample point $s_j$ is considered relevant if $v_i$ is inside one of the signal value regions determined for access points $a_i$ in sample point $s_j$. In case the signal value distribution associated with sample point $s_j$ is symmetrical and single-peaked, and $v_{min}$ and $v_{max}$ are the lower and upper bound, respectively, of a signal value region determined as described above, the relevance criterion can be written as:

$$v_{min} \leq v_i \leq v_{max}$$

$R_j[v]$ denotes the resultant set of relevant sample points assuming that the observed signal parameter value of access point $a_i$ is v.

FIG. 13 shows an initialization algorithm 1300 for initializing sets of relevant sample points. Line 1302 defines a Begin . . . . End loop which is executed for each access point $a_j$ in the set A of sample points. Line 1304 empties the set $R_j[v]$ of relevant sample points for each possible value of the signal parameter value v. Line 1306 defines Begin . . . End loop which is executed for each sample point $s_i$ in the set S of sample points. Lines 1308 and 1310 calculate the minimum and maximum signal parameter value, $v_{min}$ and $v_{max}$, respectively such that the probability for an observation to be lower than $v_{min}$ or higher than $v_{max}$ is $\epsilon$. Line 1314 adds the current sample point $s_i$ to the set of $R_j[v]$ of relevant sample points for the signal parameter value v.

FIG. 14 shows an algorithm 1400 for finding a set $R \subset S$ of relevant sample points, ie, sample points which are relevant for determining the location corresponding to observation $\bar{v}$. Line 1402 creates an empty set C which will contain a set of candidate sample points. Line 1404 initializes a variable $F_{max}$ for the number of audible (detectable) access points. Line 1406 begins a For loop which is executed for each signal parameter value $v_i$ in the observation vector $\bar{v}$, provided that the signal parameter value $v_i$ is not "NA" (not available). On line 1408 the variable $F_{max}$ for the number of audible access points is increased by one. Line 1410 begins a For loop which is executed for each sample point $s_j$ which, based on the range considerations described in connection with FIGS. 11A to 11C, is a possible sample point given the observation $R_i[v_i]$.

Line 1412 begins an If . . . . Then construct whose Then part is executed if sample point $s_j$ is not a member of the set C of candidate sample points. On line 1414 the sample point $s_j$ is added to the set C of candidate sample points. On line 1416 a hit counter F[j] is initialized to one. The Else part of the If . . . Then construct contains line 1418 on which the hit counter F[j] is increased by one. In some implementations, the value added to the hit counter F[j] is not fixed at one but depends on the likelihood of the observed value.

Line 1420 begins a second part of the algorithm 1400. On line 1420 the set of relevant sample points is initialized to an empty set. Line 1422 begins a For loop which is executed for each sample point $s_j$ in the set C of candidate sample points. Line 1424 is an If . . . . Then construct which is executed if the number $F_{max}$ of audible access points minus the hit counter F[j] is smaller than or equal to a certain tolerance margin K. On line 426 sample point $s_j$ is added to the set R. Finally, on line 1428 the resultant set R of relevant sample points is returned to the calling application.

The significance of the tolerance margin K is as follows. If K=0, the algorithm 1400 operates like the procedure shown in FIGS. 11A-11C, particularly in FIG. 11C, in the sense that a sample point is considered relevant only if it is a possible sample point for every signal parameter value in the observation vector $\bar{v}$. It may happen, however, that the value of K=0 imposes too strict a criterion and produces an empty or a very small set of relevant access points. A value of K=n;

n=1, 2, ..., means that the sample point is considered relevant even if it is not present in n of the sets R1 ... R3 shown in FIG. 11C.

FIG. 15 illustrates expansion of the single-peak examples shown in FIGS. 12A-14 to multiple peaks. Reference numeral 1502 denotes an X-Y coordinate system in which a threshold level 1504 intersects a curve 1506. FIG. 15 shows two regions in which the curve 1506 lies higher than the threshold level 1504. Region A1 extends from $x_1$ to $x_2$, while region $A_2$ extends from $x_3$ to $x_4$. The idea is to set the threshold level 1504 such that a condition denoted by reference numeral 1508 is satisfied. In plain text, the condition 1508 states that the integral of the probability P(V=x), calculated over the peak regions $A_1, A_2, \ldots$, equals 1−ϵ.

In some embodiments of the invention, the data model is not a probabilistic model. For example, the sample points may contain only some statistical summary of the measurable physical quantities such as an average, a median, a minimum, or a maximum. Also, the sample points may contain one or more of the observations as originally measured or some values derived from the observations. Yet another possibility is that sample points contain values obtained from computer simulations such as ray-tracing techniques.

In some embodiments of the invention, the relevance criteria may be based on distances to values associated with the sample points. For example, if $x_i$ is a signal value for access point $a_i$ associated with a sample point $s_j$, the lower and upper bounds for a signal value region may be defined using a predetermined margin z as:

$$v_{min} = x_i - Z;$$

$$v_{max} = x_i + Z;$$

Relevance Indicators with Graph-and History-Based Positioning

Positioning uncertainty can be further reduced by using the relevance indicators with a graph-based positioning technique which is disclosed in reference document 1. This document discloses graph-based positioning techniques in connection with Hidden Markov Models, but the present invention is not restricted to Hidden Markov Models. The graph-based positioning can be summarized as follows. A topology graph models the topology of the wireless communication environment. The topology graph indicates a set of nodes, wherein each node indicates a permissible location in the positioning environment. The topology graph also indicates a set of arcs, wherein each arc indicates a permissible target object transition between two nodes. The topology graph is used to estimate the target object's location based on the data model and the sequence of observations. For example, the topology graph, which models the topology of the positioning environment, can be used to exclude impossible locations and/or impossible transitions between locations.

FIG. 16 illustrates the use of a graph-based positioning technique in connection with the relevance indicators of the present invention. In the example shown in FIG. 16, a topology graph TG models permissible locations and transitions in a positioning environment. The topology graph TG shown in this simple example comprises 20 nodes which are denoted by reference signs N1-N20. In this example, the nodes N1-N20 are also sample points of the data model. Reference signs T1-T4 denote target object locations at four different instances of time. Reference signs S11-S14 denote four different sets of relevant sample points, each set corresponding to a different instance of time T1-T4. The sets of relevant sample points can be determined by means of the relevance indicators described earlier in this specification.

A diagram 1610 illustrates determination of possible target object locations at times T1-T4. At time T1, the set S11 of relevant points comprises sample points (nodes) N3-N6, as indicated by the four X signs. At time T2, the set S12 of relevant sample points comprises nodes N6, N7, N14 and N15. At time T3, the set S13 of relevant sample points comprises nodes N6-N9. Finally, at time T4, the set S14 of relevant sample points comprises nodes N1, N9-N13 and N18.

In this example, we assume that the target object can stand still or move from one node to its immediate neighbour in one unit of time, but it cannot move fast enough to jump two or more inter-node arcs in one unit of time. Based on the information available at time T1, each of the nodes N3-N6 is a possible target object location, even if all locations are not equally probable. But at time T2, the rule of at most one inter-node jump per unit of time excludes nodes N3 and N4 at time T1, because the target object could not have moved from either of these nodes to a possible node at T2. The same rule also excludes nodes N14 and N15 at time T2, because these nodes are not reachable from the set of possible nodes at T1.

At time T3, the set S13 of relevant sample points comprises nodes N6-N9. But the rule of at most one inter-node jump per unit of time excludes node N9 because N9 is two inter-node jumps away from any possible node at time T2. Finally, at time T4, the target object's location can be fixed at node N9, although the set S14 of relevant sample points also comprises nodes N1, N10-N13 and N18. But N9 is the only node that can be reached by one inter-node jump from any of the possible nodes at T3.

It can be seen that the target object's transition history at times T1 through T4 can be used to reduce (or eliminate) uncertainty concerning the target object's prior locations, in addition to reducing positioning uncertainty concerning the target object's current location. As stated earlier, based on the information available at time T1, the target object could have been at any of nodes N3-N6. But when the positioning engine has the entire transition history (four steps in this example) at its disposal, the positioning engine can establish the target object's path as N6-N7-N8-N9, as shown by the four circles in the diagram 1610.

The graph-based positioning described here, in connection with FIG. 16, and in more detail in the aforementioned PCT application, can be used to further reduce positioning uncertainty, because some nodes requiring impossible transitions can be excluded. The graph-based positioning can also be used to reduce computational load, which is the principal aim of this invention, because sample points (nodes) requiring impossible transitions can be omitted from calculations. In this example, the set S14 of relevant sample points at time T4 comprises seven nodes (N1, N9-N13 and N18), but only one node, namely N9, is a possible node when the target object's entire transition history is considered.

The above example can be described formally, by using Hidden Markov Model-based techniques. Let $L(s_i)$ denote the set of neighbours of the sample points in set $s_i$, ie, sample points reachable from the sample points in set $s_i$ by one step. L(R) denotes the set of neighbours of the relevant sample points:

$$L(R) = \bigcup_{i=1}^{K} L(s_i), \, s_i \in R$$

In the following, $HMM_1, HMM_2, \ldots HMM_i$, denote consecutive observation cycles in the Hidden Markov Model. The sets of relevant sample points (R) are as follows:
$HMM_1$: $R_{HMM/1} = R_1 \subset S$
$HMM_2$: $R_{HMM/2} = R_2 \cap L(R_{HMM/1})$
$HMM_i$: $R_{HMM/i} = R_i \cap L(R_{HMM/i-1})$ This feature is illustrated in the diagram 1610 by the horizontal bars. The dashed horizontal bars indicate neighbours of relevant sample points, while the solid horizontal bars indicate neighbours of relevant sample points after excluding impossible transitions. It can be seen that the inventive technique reduces the computational burden because the observation probabilities need to be calculated only in respect of the sample points which belong in the sets $R_{HMM/1 \ldots i}$ of sample points deemed relevant by the HMM considerations.

If the set of relevant sample points $R_{HMM/k}$ is empty or very close to empty, this means that something unexpected has happened and some measures should be taken before positioning is resumed. For example, the observed signals may be temporarily blocked, the data model may be out of date, the sensing device attached to the target object may be malfunctioning, or the like. If the problem persists, an alert should be triggered.

In the example described in connection with FIG. 16, the topology graph TG was used such that the location of the target object TO was deemed to be one of the nodes along the topology graph TG. In an alternative implementation, the target object's location is interpreted as any point along the topology graph TG, ie, not necessarily one of the predetermined nodes N1-N20. In yet another implementation, the target object's location is interpreted as any point whose distance differs from the topology graph TG by no more than a predetermined margin, such as half a corridor width. Yet further, the topology graph TG may comprise a combination of arcs, which are suitable for modelling elongated paths, and regions, which are suitable for modelling open spaces, such as large rooms.

It is readily apparent to a person skilled in the art that, as the technology advances, the inventive concept can be implemented in various ways. The invention and its embodiments are not limited to the examples described above but may vary within the scope of the claims.

REFERENCE DOCUMENTS

1. WO2004/008795 discloses location-determination techniques which use a graph that models the topology of the target object's communication environment.
2. WO03/102622 discloses techniques for locating a target in a wireless environment. The techniques use a plurality of submodels of the wireless environment, each submodel indicating a probability distribution for signal values at one or more locations in the wireless environment. The submodels are combined to a probabilistic model of the environment which indicates probability distributions for signal values in the environment.
3. WO2004/008796 discloses a location-determination technique which comprises determining a plurality of device models that compensate for the differences between different target objects' observations of signal quality parameters and selecting, among the multiple device models, a specific device model for a specific target object.
4. WO02/054813 discloses methods and equipment for estimating a receiver's location in a wireless telecommunication environment.

The above reference documents are commonly-owned patent applications which are incorporated herein by reference.

I claim:

1. A method for estimating a set of properties of a target object in an environment, wherein the set of properties comprises location; the method comprising:
   modelling the environment with a topology model and a data model, wherein the topology model indicates permissible locations and transitions within the environment, and the data model indicates at least one location-dependent physical quantity for each of several permissible locations indicated by the topology model;
   modelling location changing characteristics of the target object with one or more motion models, wherein each motion model models a specific type of a target object and obeys permissible locations and transitions indicated by the topology model;
   associating to the target object one or more co-located sensing devices, each of which is capable of making observations of one or more of the location-dependent physical quantities;
   assigning to the target object a set of particles, each of which has a set of attributes, wherein the set of attributes comprises at least a location in relation to the topology model;
   estimating the set of properties of the target object with the set of attributes of the particles assigned to the target object; and
   updating the set of particles in a plurality of update cycles, wherein each update cycle comprises the following phases a) to c):
   a) determining a degree of belief for each particle to accurately estimate the set of properties of the target object, using the data model and observations from at least one sensing device associated to the target object;
   b) determining a weight for each particle based on at least the determined degree of belief; and
   c) generating a set of new particles for update cycle n+1 wherein;
      at least some of the new particles are based on one or more parent particles for update cycle n, wherein
      the likelihood of a particle for update cycle n to be selected as a parent particle for a new particle in update cycle n+1 is a non-decreasing function of the weight of the particle; and
   the set of attributes of a new particle for update cycle n+1 is derived from the set of attributes of one or more parent particles for update cycle n by using at least one of the one or more motion models and a predetermined algorithm.

2. A method according to claim 1, further comprising:
   generating a snapshot of weighted particles for update cycle k, wherein the snapshot contains some or all particles for update cycle k, and assigning to each particle a weight defined by the following recursive rules, wherein n is the latest update cycle for which the weights have been determined:
   if k equals n, the weight of a particle is based on the weight determined in step b of claim 1;
   if k is less than n, the weight of a particle is based on the sum of weights of all direct descendants of the particle existing in a snapshot generated for update cycle k+1; and
   using the snapshot to estimate the set of properties of the target object at the time of update cycle k.

3. A method according to claim 2, further comprising:
   dividing the snapshot of weighted particles for update cycle k into one or more clusters, wherein each cluster contains particles that are similar to each other according to one or more predetermined similarity criteria; and selecting at least one cluster and estimating the set of properties of the target object at the time of update cycle k for each selected cluster by using particles and weights in the selected cluster and omitting particles and weights not in the cluster.

4. A method according to claim 3, wherein at least one of the one or more predetermined similarity criteria is based on the particles' location whereby each cluster contains particles close to each other.

5. A method according to claim 3, further comprising: maintaining a plurality of predetermined zones, wherein each zone includes one or more permissible locations of the topology model; and wherein at least one of the one or more predetermined similarity criteria is based on the plurality of zones, wherein particles whose locations belong to the same zone belong to the same cluster.

6. A method according to claim 3, further comprising associating a confidence value to an estimate generated using a cluster, wherein the confidence value is based on the sum of weights of particles in the cluster divided by the total sum of weights in the snapshot.

7. A method according to claim 3, wherein the estimated set of properties of the target object includes at least one spatial property in the environment, the method further comprising:

modelling the at least one spatial property with the data model, wherein the data model indicates the spatial property for each of several locations within the environment;

wherein the step of estimating the set of properties of the target object comprises:

generating particle-specific estimates of the spatial property for each particle, using the data model to indicate the spatial property at the location of the particle; and combining particle-specific estimates using the weights of the particles.

8. A method according to claim 1, wherein the data model is or comprises a probabilistic model which indicates a probability distribution for the at least one location-dependent physical quantity at the permissible locations indicated by the topology model; and wherein the step of determining a degree of belief for a particle comprises:

indicating a probability distribution for a location-dependent physical quantity at the location of the particle by using the data model; and using the indicated probability distribution to determine the probability of an observation of the physical quantity from at least one sensing device associated to the target object.

9. A method according to claim 8, wherein the data model is or comprises a probabilistic model which indicates a probability distribution for the at least one location-dependent physical quantity at several sample points; and wherein the step of indicating a probability distribution comprises:

selecting at least two sample points near the location of the particle; and combining the probability distributions for the physical quantity at the selected sample points.

10. A method according to claim 9, wherein the step of combining the probability distributions comprises:

forming a cumulative distribution function for each selected sample point and weighting each of the cumulative distribution functions with a relative weight; and forming a combination of the weighted cumulative distribution functions.

11. A method according to claim 1, wherein the topology model comprises nodes and arcs between the nodes to indicate the permissible locations and transitions.

12. A method according to claim 9, wherein the topology model comprises nodes and arcs between the nodes to indicate the permissible locations and transitions; and wherein the step of selecting at least two sample points comprises selecting at least two of the sample points that can be reached from the location of the particle by following the arcs.

13. A method according to claim 1, further comprising selecting the motion model for a target object adaptively, wherein the adaptive selection comprises:

selecting a specific motion model for each particle and setting the attribute set of a particle to contain a reference to the motion model selected for the particle; and the step of deriving the set of attributes of a new particle from the set of attributes of one or more parent particles comprises using the motion models referred by the attribute sets of the parent particles.

14. A method according to claim 1, further comprising:

maintaining a plurality of device models each of which is capable of correcting observations of one or more sensing devices;

selecting a specific device model for at least one of the co-located sensing devices;

correcting the observations of the at least one of the co-located sensing devices with the selected device model.

15. A method according to claim 14, further comprising selecting the at least one device model adaptively, wherein the adaptive selecting comprises:

selecting at least one specific device model for each particle and setting the attribute set of a particle to contain a reference to each device model selected for the particle; and applying each device model referred to by the attribute set of the particle to correct observations from the at least one sensing device before the step of determining a degree of belief for the particle.

16. A method according to claim 1, wherein the data model indicates a set of expected values of the location-dependent physical quantities for each of a plurality of sample points and the method further comprises:

maintaining a set of relevance indicators for indicating one or more sets of relevant sample points wherein the one or more sets of relevant sample points are subsets of the sample points in the data model;

based on the observations of the one or more of the location-dependent physical quantities and on the set of relevance indicators, determining a current set of relevant sample points; and using the current set of relevant sample points to increase computational efficiency.

17. A method according to claim 16, further comprising discarding particles located far from the current set of relevant sample points.

18. A method according to claim 16, wherein the step a) of claim 1 further comprises assigning a minimal degree of belief to particles far from the current set of relevant sample points without further calculations.

19. A method according to claim 16, wherein the step c) of claim 1 further comprises generating some additional parentless particles near the relevant sample points.

20. A method according to claim 1, wherein the one or more physical quantities comprise at least one signal value.

21. A method according to claim 1, wherein the set of properties comprises one or more motional properties.

22. A property-estimation apparatus for estimating a set of properties of a target object in an environment, wherein the set of properties comprises location, the property-estimation apparatus comprising:

a topology model for indicating permissible locations and transitions within the environment and a data model for indicating at least one location-dependent physical quantity for each of several permissible locations indicated by the topology model;

one or more motion models for modelling location changing characteristics of the target object, wherein each motion model models a specific type of a target object and obeys permissible locations and transitions indicated by the topology model;

an association of one or more co-located sensing devices to the target object, wherein each sensing device is capable of making observations of one or more of the location-dependent physical quantities;

means for assigning to the target object a set of particles, each of which has a set of attributes, wherein the set of attributes comprises at least a location in relation to the topology model;

a property estimator for estimating the set of properties of the target object with the set of attributes of the particles assigned to the target object; and update means for updating the set of particles in a plurality of update cycles, wherein each update cycle comprises the following phases a) to c):

a) a determination of a degree of belief for each particle to accurately estimate the set of properties of the target object, using the data model and observations from at least one sensing device associated to the target object;

b) a determination of a weight for each particle based on at least the determined degree of belief; and c) a generation of a set of new particles for update cycle n+1 wherein;

at least some of the new particles are based on one or more parent particles for update cycle n, wherein the likelihood of a particle for update cycle n to be selected as a parent particle for a new particle in update cycle n+1 is a non-decreasing function of the weight of the particle; and the set of attributes of a new particle for update cycle n+1 is derived from the set of attributes of one or more parent particles for update cycle n by using at least one of the one or more motion models and a predetermined algorithm.

23. A property-estimation apparatus according to claim 22, further comprising means for dynamically adjusting the number of particles assigned to a target object based on one or more of the following:

a variance in the attributes of particles;
the number of target objects served by the property-estimation apparatus;
quality requirements for the property estimate;
a priority assigned to the target object;
a combined rate of observation sets received from the sensing devices per unit of time;
a motion history of the target object; and
overall load of the property-estimation apparatus.

24. A property-estimation apparatus according to claim 22, further comprising means for dynamically adjusting the time interval between update cycles based on one or more of the following:

variance in the attributes of particles;
the number of target objects served by the property-estimation apparatus;
quality requirements for the property estimate;
a priority assigned to the target object;
a combined rate of observation sets received from the sensing devices per unit of time a motion history of the target object; and
overall load of the property-estimation apparatus.

25. A computer program product stored on a non-transitory computer-readable medium, comprising program code means for carrying out the method of claim 1 when the computer program product is executed in a data processor.

\* \* \* \* \*